United States Patent
Shimazawa et al.

(10) Patent No.: US 8,149,653 B2
(45) Date of Patent: Apr. 3, 2012

(54) LIGHT SOURCE UNIT FOR THERMALLY-ASSISTED MAGNETIC RECORDING CAPABLE OF MONITORING OF LIGHT OUTPUT

(75) Inventors: Koji Shimazawa, Tokyo (JP); Yoshihiro Tsuchiya, Tokyo (JP); Seiichi Takayama, Tokyo (JP); Nobuyuki Mori, Tokyo (JP); Yasuhiro Ito, Tokyo (JP); Kosuke Tanaka, Tokyo (JP); Osamu Shindo, Tokyo (JP); Ryuji Fujii, Shatin (CN); Takashi Honda, Shatin (CN); Yoshitaka Sasaki, Milpitas, CA (US)

(73) Assignees: TDK Corporation, Tokyo (JP); Headway Technologies, Inc., Milpitas, CA (US)

( * ) Notice: Subject to any disclaimer, the term of this patent is extended or adjusted under 35 U.S.C. 154(b) by 147 days.

(21) Appl. No.: 12/728,510

(22) Filed: Mar. 22, 2010

(65) Prior Publication Data
US 2011/0228653 A1  Sep. 22, 2011

(51) Int. Cl.
*G11B 11/00* (2006.01)
(52) U.S. Cl. .................. 369/13.33; 369/112.27
(58) Field of Classification Search ............. 369/13.02, 369/13.24, 30.03, 13.32, 13.33, 13.14, 13.03, 369/13.12, 112.27, 112.29, 112.14; 360/59, 360/313, 245.3, 126, 123.17, 125.31, 128; 29/603.07; 228/121; 156/250
See application file for complete search history.

(56) References Cited

U.S. PATENT DOCUMENTS

| | | | |
|---|---|---|---|
| 4,860,276 A | 8/1989 | Ukita et al. | |
| 5,481,082 A | 1/1996 | Yamamoto | |
| 7,538,978 B2 | 5/2009 | Sato et al. | |
| 7,804,655 B2 * | 9/2010 | Shimazawa et al. | 360/59 |
| 2005/0213436 A1 | 9/2005 | Ono et al. | |
| 2008/0043360 A1 | 2/2008 | Shimazawa et al. | |
| 2008/0056073 A1 | 3/2008 | Shimizu | |
| 2009/0052078 A1 | 2/2009 | Tanaka et al. | |
| 2011/0242697 A1 * | 10/2011 | Mori et al. | 360/59 |

FOREIGN PATENT DOCUMENTS

JP   A-2009-301597   12/2009

OTHER PUBLICATIONS

Rottmayer, R. et al., "Heat-Assisted Magnetic Recording," IEEE Transactions on Magnetics, Oct. 10, 2006, pp. 2417-2421, vol. 42, No. 10.
U.S. Appl. No. 12/628,761, filed Dec. 1, 2009, in the name of Koji Shimazawa et al.
U.S. Appl. No. 12/726,981, filed Mar. 18, 2010, in the name of Koji Shimazawa et al.

* cited by examiner

*Primary Examiner* — Ali Neyzari
(74) *Attorney, Agent, or Firm* — Oliff & Berridge, PLC

(57) ABSTRACT

Provided is a light source unit that is to be joined to a slider to form a thermally-assisted magnetic recording head. The light source unit comprises: a unit substrate having a source-installation surface; a light source provided in the source-installation surface and emitting thermal-assist light; and a photodetector bonded to a rear joining surface of the unit substrate in such a manner that a rear light-emission center of the light source is covered with a light-receiving surface of the photodetector. The photodetector can be sufficiently close to the light source; thus, constant feedback adjustment with high efficiency for the light output of the light source can be performed. This adjustment enables light output from the light source to be controlled in response to changes in light output due to surroundings and to changes with time to stabilize the intensity of light with which a magnetic recording medium is irradiated.

14 Claims, 10 Drawing Sheets

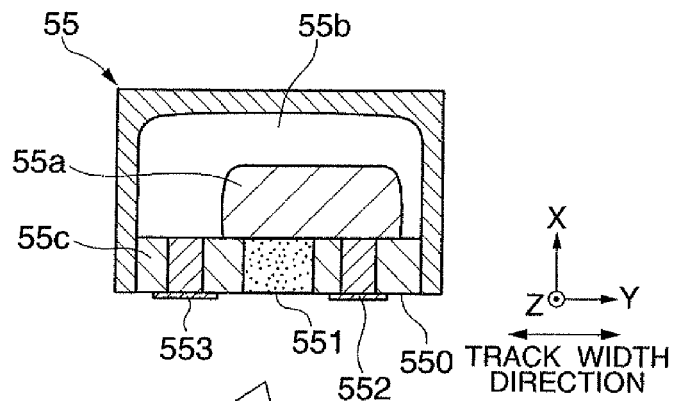
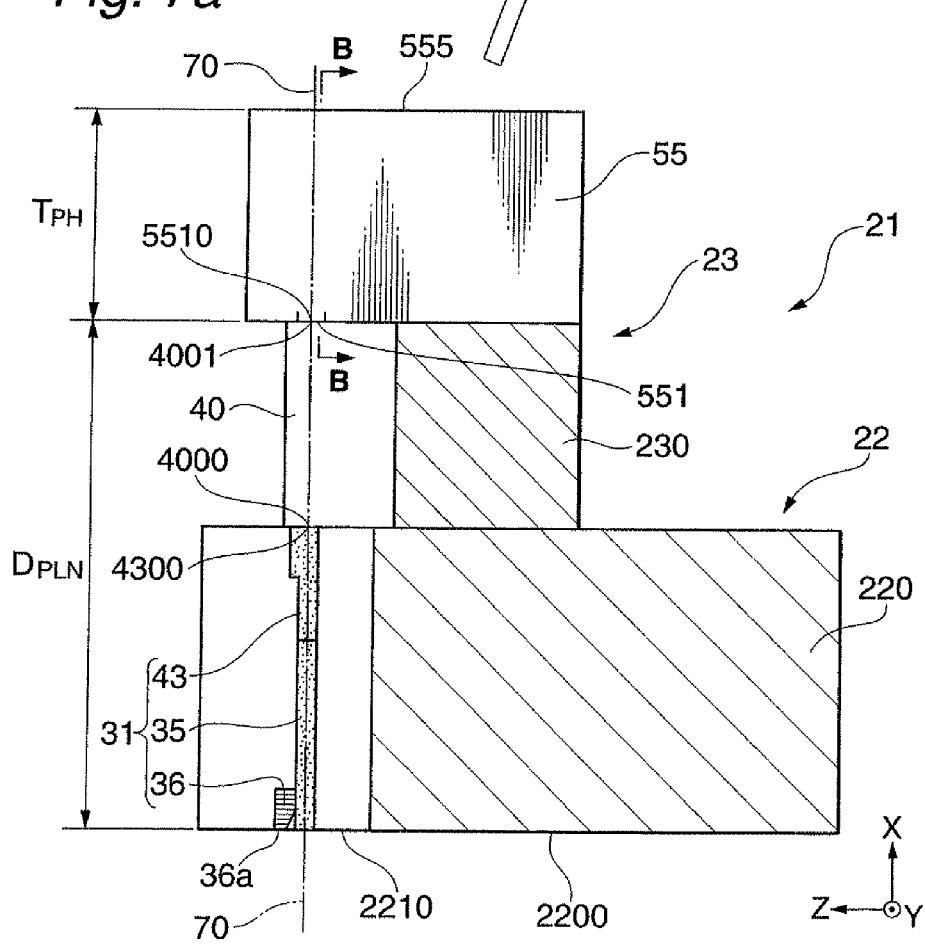
Fig. 7b
Fig. 7a

TRACK WIDTH DIRECTION

LIGHT SOURCE UNIT FOR THERMALLY-ASSISTED MAGNETIC RECORDING CAPABLE OF MONITORING OF LIGHT OUTPUT

BACKGROUND OF THE INVENTION

1. Field of the Invention

The present invention relates to a light source unit including a light source for emitting light used for thermally-assisted magnetic recording, and to a thermally-assisted magnetic recording head constituted by joining the light source unit and a slider. The present invention further relates to a method for manufacturing the light source unit.

2. Description of the Related Art

As the recording densities of magnetic recording apparatuses become higher, as represented by magnetic disk apparatuses, further improvement has been required in the performance of thin-film magnetic heads and magnetic recording media. The magnetic recording medium is generally a kind of discontinuous body of magnetic grains gathered together, and each of the magnetic grains has a single magnetic domain structure. Here, one record bit consists of a plurality of the magnetic grains. Therefore, in order to improve the recording density, it is necessary to decrease the size of the magnetic grains and reduce irregularity in the boundary of the record bit. However, the decrease in size of the magnetic grains raises a problem of degradation in thermal stability of the magnetization due to the decrease in volume.

As a measure against the thermal stability problem, it may be possible to increase the magnetic anisotropy energy $K_U$ of the magnetic grains. However, the increase in energy $K_U$ causes the increase in anisotropic magnetic field (coercive force) of the magnetic recording medium. Whereas, the intensity of write field generated from the thin-film magnetic head is limited almost by the amount of saturation magnetic flux density of the soft-magnetic material of which the magnetic core of the head is formed. As a result, the head cannot write data to the magnetic recording medium when the anisotropic magnetic field of the medium exceeds the write field limit.

Recently, as a method for solving the problem of thermal stability, so-called a thermally-assisted magnetic recording technique is proposed. In the technique, a magnetic recording medium formed of a magnetic material with a large energy $K_U$ is used so as to stabilize the magnetization, then anisotropic magnetic field of a portion of the medium, where data is to be written, is reduced by heating the portion; just after that, writing is performed by applying write field to the heated portion.

In this thermally-assisted magnetic recording technique, there has been generally used a method in which a magnetic recording medium is irradiated and thus heated with a light such as near-field light (NF-light). In this case, it is significantly important where and how a light source with a sufficiently high light output should be disposed inside a head in order to stably supply a light with a sufficiently high intensity at a desired position on the magnetic recording medium.

As for the setting of the light source, for example, U.S. Pat. No. 7,538,978 B2 discloses a configuration in which a laser unit including a laser diode is mounted on the back surface of a slider, and US Patent Publication No. 2008/0056073 A1 discloses a configuration in which a structure of a laser diode element with a monolithically integrated reflection mirror is mounted on the back surface of a slider. Further, US Patent Publication No. 2005/0213436 A1 discloses a structure of slider that is formed together with a semiconductor laser, and Robert E. Rottmayer et al. "Heat-Assisted Magnetic Recording" IEEE TRANSACTIONS ON MAGNETICS, Vol. 42, No. 10, p. 2417-2421 (2006) discloses a configuration in which a diffraction grating is irradiated with a light generated from a laser unit provided within a drive apparatus.

Furthermore, the present inventors propose a thermally-assisted magnetic recording head with a "composite slider structure" which is constituted by joining a light source unit provided with a light source to the end surface (back surface) of a slider provided with a write head element, the end surface being opposite to the opposed-to-medium surface of the slider. The "composite slider structure" is disclosed in, for example, US Patent Publication No. 2008/043360 A1 and US Patent Publication No. 2009/052078 A1.

While various forms of installation of a light source have been proposed, all of the laser diodes described above are devices made of a semiconductor. Outputs of semiconductor devices vary in response to changes in ambient temperature. In particular, ambient temperatures that are assumed in environments in which magnetic disk apparatuses are used are in the range of −5 to 60° C., for example. Accordingly, the range of variations of light output from the light source provided in a head should be estimated to be considerably wide. In addition, since changes in temperature of the light source due to heat radiated from surrounding elements and the light source itself are also considerably large, the range of variations in light output from the light source further widens. Therefore, in order to stably provide output light with a constant intensity at different temperatures, measures should be taken to detect changes in light output from the light source in real time and to keep the light output from the light source constant.

However, it is difficult to install a system for monitoring the light in an element-integration surface of a head for thermal assist together with an optical system that propagates the light for thermal assist, because of a limited area of the element-integration surface. In practice, femto sliders are commonly used as head slider substrates. The area of the element-integration surface of the femto slider is as small as 230 micrometers (μm)×700 μm. In these circumstances, little has been done to monitor light output from the light source for thermal assist.

SUMMARY OF THE INVENTION

Some terms used in the specification will be defined before explaining the present invention. In a layered structure or an element structure formed in the element-integration surface of a slider substrate or in the source-installation surface of a unit substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and −Z side to a leading side. And Y-axis direction indicates a track width direction, and X-axis direction indicates a height direction.

According to the present invention, a light source unit that is to be joined to a slider to form a thermally-assisted magnetic recording head, the slider including an optical system formed in an element-integration surface of a slider substrate and configured to propagate a light for thermal assist, is provided, which comprises:

a unit substrate comprising: a joining surface that faces the slider substrate when the unit substrate is bonded to the slider; and a source-installation surface adjacent to the joining surface;

a light source provided in the source-installation surface and emitting the light for thermal assist that is to be entered into the optical system; and a photodetector configured to measure an output from the light source for adjusting the output, bonded to a rear joining surface of the unit substrate that is on the side opposite to the joining surface in such a manner that a rear light-emission center of the light source on the side opposite to a light-emission center from which the light for thermal assist is emitted is covered with a light-receiving surface of the photodetector.

The light-source unit according to the present invention is provided with a photodetector which enables constant monitoring of light output from the light source. Here, the light-receiving surface of the photodetector and the rear light-emission center of the light source can be sufficiently close to each other; thus, the light output from the rear light-emission center of the light source can be monitored with high efficiency. Accordingly, feedback adjustment of light output from the light source that emits light for thermal assist can be accomplished. This adjustment enables light output from the light source to be controlled in response to changes in light output due to surroundings and to changes with time to stabilize the intensity of light with which a magnetic recording medium is irradiated for thermal assist. Consequently, a region of a magnetic recording medium where data is to be written can be properly and stably heated. Therefore, a good thermally-assisted magnetic recording can be accomplished.

Further, in the light source unit according to the present invention, a first lead electrode layer connected electrically to one electrode of the light source and one electrode of the photodetector and a second lead electrode layer connected electrically to the other electrode of the photodetector are preferably provided in the source-installation surface of the unit substrate. In this case, it is further preferable that a bank layer is provided in a region on the source-installation surface of the unit substrate and in front of at least each of regions between the first and second lead electrode layers when viewed from the joining surface side.

Furthermore, in the light source unit according to the present invention, it is preferable that the light source is a laser diode of edge-emitting type, and is bonded to the unit substrate in such a manner that an n-electrode is opposed to the source-installation surface. In this preferable case, the position of the light-receiving surface of the photodetector can be designed in such a manner that laser light emitted with its emitting center in the rear light-emission center can be sufficiently incident on the light-receiving surface of the photodetector which is exposed from the unit substrate. Further, in the light source unit according to the present invention, an adhesion material layer for bonding with the slider is preferably provided on the joining surface of the unit substrate.

According to the present invention, a thermally-assisted magnetic recording head is further provided, which comprises:

a slider comprising: an optical system formed in an element-integration surface of a slider substrate and configured to propagate a light for thermal assist; and a write head element provided in the element-integration surface and configured to write data on a magnetic recording medium; and a light source unit as claimed in claim 1 joined to the slider in such a manner that a back surface of the slider substrate and the joining surface of the unit substrate are opposed to each other so that a light emitted from the light-emission center can enter the optical system, the back surface being on the side opposite to an opposed-to-medium surface of the slider substrate.

In the thermally-assisted magnetic recording head according to the present invention, it is preferable that a light-receiving center in a light-receiving surface of the photodetector, the rear light-emission center of the light source, the light-emission center of the light source, and a light-receiving center in a light-receiving surface of the optical system are located substantially in a straight line, and a near-field light generator (NFL-generator) that emits a NF-light for thermal assist from an end extending to a head end surface on an opposed-to-medium surface side is provided in or near the straight line. Since a series of these optical components are disposed substantially in line in the head, a highly efficient configuration is achieved in which loss in light from the light source is minimized. That is, NF-light for thermal assist that is generated from the NFL-generator and has a sufficient intensity, and monitor output from the photodetector that has a required intensity, can be obtained with a high efficiency. In this case, a distance between a surface of the photodetector that is on the side opposite to the light-receiving surface and the end of the NFL-generator extending to the head end surface on the opposed-to-medium surface side is preferably less than or equal to 700 μm (micrometers). This setting of the distance can improve the flying stability of the head and reduce the thickness of the head gimbal assembly (HGA) containing the head.

According to the present invention, there is further provided an HGA comprising: a suspension; and the thermally-assisted magnetic recording head as described above fixed on the suspension. In the HGA, a portion of the back surface of the slider substrate on the side opposite to the opposed-to-medium surface is bonded to the suspension, the suspension comprising a aperture, and the light source unit protrudes through the aperture on the side opposite to the slider with respect to the suspension, and one ends of wiring members provided on the suspension are electrically connected with the first lead electrode layer, the second lead electrode layer, and the other electrode of the light source.

According to the present invention, a magnetic recording apparatus is further provided, which comprises: at least one HGA as described above; at least one magnetic recording medium; and a control circuit configured to control light-emission operations of the light source by using a monitor output from the photodetector, and to control write operations that the thermally-assisted magnetic recording head performs to the at least one magnetic recording medium.

According to the present invention, a method for manufacturing the light source unit as described above is further provided, which comprises the steps of:

forming a plurality of pairs of a first lead electrode layer and a second lead electrode layer on a source-installation surface of a light-source-unit row bar;

bonding a photodetector row bar onto a rear joining surface of the light-source-unit row bar that is on the side opposite to a joining surface of the light-source-unit row bar in such a manner that a plurality of light-receiving surfaces and a plurality of pairs of electrodes of the photodetector row bar are positioned on the light-source-unit row bar side and exposed, the photodetector row bar being to be cut into photodetectors;

butting the light source against the photodetector row bar so that a light-receiving surface of the photodetector row bar covers a rear light-emission center of the light source and thus positioning the plurality of light sources while placing each of the plurality of light sources on the first lead electrode layer with one electrode of the light source positioned at the bottom of the light source;

bonding the plurality of light sources to a light-source-unit row bar; and cutting the light-source-unit row bar to which the photodetector row bar and the plurality of light sources have been bonded into a plurality of light source units.

In the manufacturing method according to the present invention, it is preferable to further comprise the steps of:

providing a bank layer in a region on the source-installation surface of the light-source-unit row bar, the region being in front of at least each of regions between the first and second lead electrode layers when viewed from the joining surface side;

stacking a plurality of the light-source-unit row bars in each of which a plurality of sets of the first lead electrode layer, the second lead electrode layer, and the bank layer are formed, in such a manner that the plurality of sets formed are sandwiched between the light-source-unit row bars and joining surfaces of the light-source-unit row bars are aligned on the same side; and depositing a conductive material on the joining surfaces of the plurality of stacked light-source-unit row bars to form an adhesion material layer for bonding with a slider while using the bank layer to prevent the conductive material from being deposited at least between the first and second lead electrode layers.

Further, in the above-described case, it is preferable that an alloy containing one element selected from a group consisting of gold, silver, copper, germanium, aluminum and magnesium is deposited on the joining surfaces of the plurality of stacked light-source-unit row bars to form the adhesion material layer.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 7a shows a cross-sectional view taken by ZX plane, schematically illustrating the arrangement of the photodiode, the laser diode and the optical system in the thermally-assisted magnetic recording head;

FIG. 7b shows a cross-sectional view taken by XY plane, schematically illustrating the structure of the photodiode;

DESCRIPTION OF THE PREFERRED EMBODIMENTS

Figure 1:
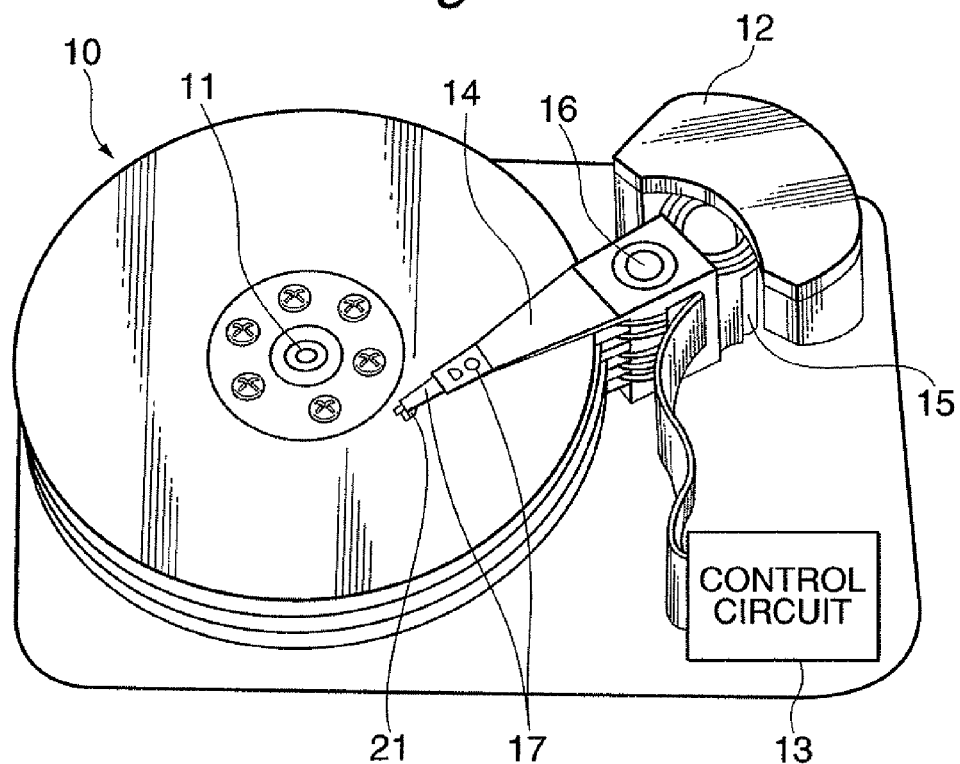
FIG. 1 shows a perspective view schematically illustrating a structure of a major part in one embodiment of a magnetic disk apparatus according to the present invention.

FIG. 1 shows a perspective view schematically illustrating a structure of a major part in one embodiment of a magnetic disk apparatus according to the present invention.

A magnetic disk apparatus as a magnetic recording apparatus shown in FIG. 1 includes: a plurality of magnetic disks 10 rotating around a rotational axis of a spindle motor 11; an assembly carriage device 12 provided with a plurality of drive arms 14 thereon; an HGA 17 attached on the top end portion of each drive arm 14 and provided with a thermally-assisted magnetic recording head 21; and a recording/reproducing and light-emission control circuit 13 for controlling write/read operations of the thermally-assisted magnetic recording head 21 and further for controlling the emission operation of a laser diode as a light source that generates laser light for thermally-assisted magnetic recording, based on monitoring output generated from a light detector for monitoring the output of the light source, which will be described later.

The magnetic disk 10 is, in the present embodiment, designed for perpendicular magnetic recording, and has a structure in which, for example, sequentially stacked on a disk substrate is: a soft-magnetic under layer; an intermediate layer; and a magnetic recording layer (perpendicular magnetization layer). The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and sliders 21 may be one.

Figure 2:
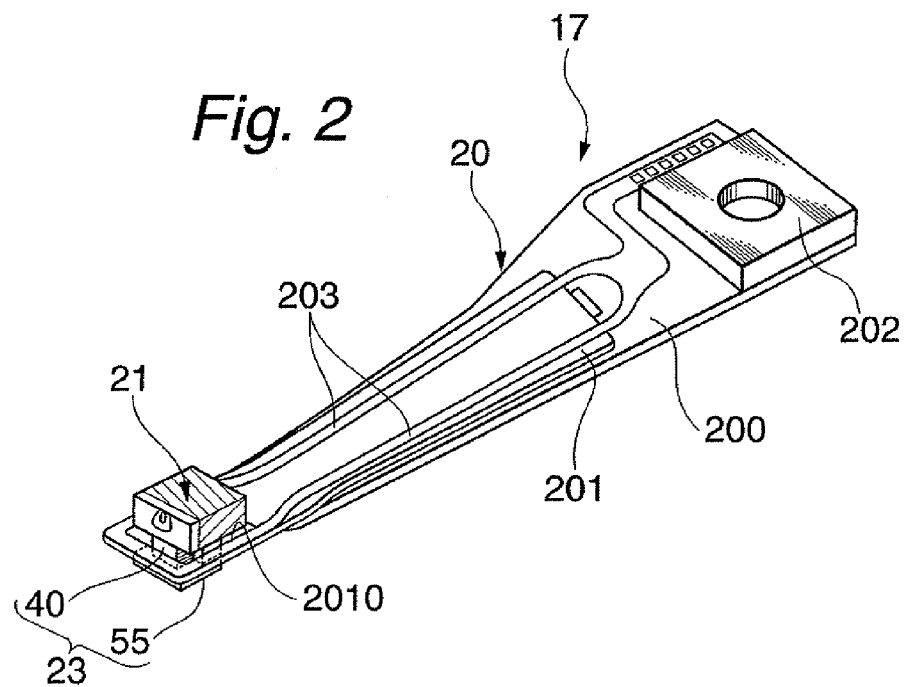
FIG. 2 shows a perspective view schematically illustrating a structure of a major part in one embodiment of an HGA according to the present invention.

FIG. 2 shows a perspective view schematically illustrating a structure of a major part in one embodiment of a head gimbal assembly (HGA) according to the present invention. In FIG. 2, the side of the HGA opposed to the surface of the magnetic disk is presented as the upper side.

Referring to FIG. 2, a suspension 20 in the HGA 17 includes a load beam 200, a flexure 201 with elasticity fixed to the load beam 200, a base plate 202 provided on the base portion of the load beam 200, and wiring members 203 provided on the flexure 201 and made up of lead conductors and connection pads electrically joined to both ends of the lead conductors. The thermally-assisted magnetic recording head 21 is fixed to the flexure 201 at the top end portion of the suspension 20 so as to face the surface of each magnetic disk 10 with a predetermined space (flying height).

Here, an aperture 2010 is provided in the flexure 201; the thermally-assisted magnetic recording head 21 is fixed in such a way that a light source unit 23 as a part of the head 21 protrudes through the aperture 2010 on the opposite side of the flexure 201. The light source unit 23 includes a laser diode 40 as a light source for thermal assist and a photodiode 55 as a light detector for monitoring the light output of the laser diode 40 and sending its monitoring output to the recording/reproducing and light-emission control circuit 13, the light-emitting operation of the laser diode 40 being controlled by the recording/reproducing and light-emission control circuit 13.

Moreover, one ends (connection pads) of the wiring members 203 are electrically connected to terminal electrodes of the thermally-assisted magnetic recording head 21, which include electrodes used for the laser diode 40 and the photodiode 55. The structure of the suspension 20 is not limited to the above-described one. An IC chip for driving the head may be mounted midway on the suspension 20, though not shown.

Figure 3:
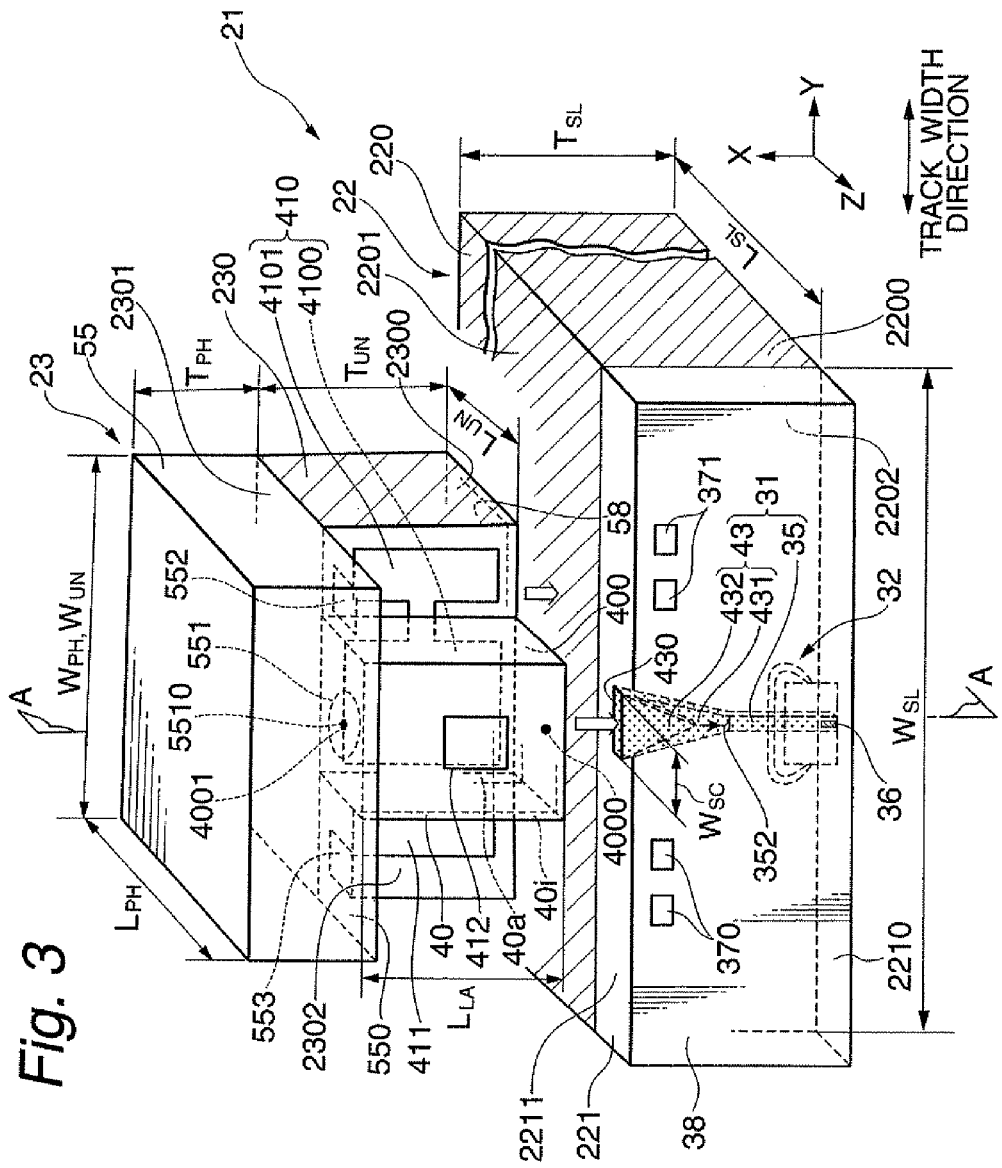
FIG. 3 shows a perspective view illustrating one embodiment of the thermally-assisted magnetic recording head according to the present invention.

FIG. 3 shows a perspective view illustrating one embodiment of the thermally-assisted magnetic recording head 21 according to the present invention.

As shown in FIG. 3, a thermally-assisted magnetic recording head 21 is constituted by aligning and joining a light source unit 23, which includes a laser diode 40 and a photodiode 55, and a slider 22, which includes an optical system 31. The slider 22 includes: a slider substrate 220 having an air bearing surface (ABS) 2200 processed so as to provide an appropriate flying height; and a head element part 221 that includes an optical system 31 and is formed on an element-integration surface 2202 that is perpendicular to and adjacent to the ABS 2200. While, the light source unit 23 includes: a unit substrate 230 having an joining surface 2300; a laser diode 40 as a light source provided on a source-installation surface 2302 that is perpendicular to and adjacent to the joining surface 2300; and a photodiode 55 bonded on a rear joining surface 2301 of the unit substrate 230 which is opposite to the joining surface 2300. The slider 22 and the light source unit 23 are bonded to each other in such a way that the back surface 2201 of the slider substrate 220 and the joining surface 2300 of the unit substrate 230 are opposed to each other and sandwich a solder layer 58 as an adhesion material layer formed of a material used for adhesion therebetween.

As also shown in FIG. 3, in the slider 22, the head element part 221 formed on the element-integration surface 2202 of the slider substrate 220 includes: a head element 32 constituted of a magnetoresistive (MR) element 33 for reading data from the magnetic disk 10 (FIG. 1) and an electromagnetic transducer 34 for writing data to the magnetic disk; a spot-size converter 43 that receives a laser light emitted from the laser diode 40, changes (reduces) the spot size of the laser light, then guides the laser light into the waveguide 35; a waveguide 35 that guides the laser light with changed spot size to the head end surface 2210 as an opposed-to-medium surface or its vicinity; a surface plasmon generator 36 that generates near-field light (NF-light) for thermal assist; and an overcoat layer 38 formed on the element-integration surface 2202 so as to cover the head element 32, the spot-size converter 43, the waveguide 35 and the surface plasmon generator 36. Here, the spot-size converter 43, the waveguide 35 and the surface plasmon generator 36 constitute the optical system 31 for generating NF-light in the head 21 (head element part 221).

One ends of the MR element 33, the electromagnetic transducer 34 and the surface plasmon generator 36 reach the head end surface 2210 as an opposed-to-medium surface. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic record layer of the magnetic disk 10 with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the spot-size converter 43 and the waveguide 35, is changed into NF-light in the surface plasmon generator 36. Then, a portion to be written of the magnetic recording layer is irradiated and thus heated with the NF-light. As a result, the anisotropic magnetic field (coercive force) of the portion is decreased to a value that enables writing; thus the thermally-assisted magnetic recording can be achieved by applying write field with use of the electromagnetic transducer 34 to the anisotropic-field-decreased portion.

Referring also to FIG. 3, a spot-size converter 43 is an optical element which receives laser light emitted from the laser diode 40 at its light-receiving end surface 430 having a width $W_{SC}$ in the track width direction (Y-axis direction), converts the laser light to laser light with a smaller spot diameter with a low loss while maintaining a single mode, and then guides the converted laser light to a light-receiving end surface 352 of the waveguide 35. Here, the single-mode is a mode in which the laser light propagating within the spot-size converter 43 has a beam cross-section with a shape of circle or ellipsoid, and the light intensity distribution in the cross-section is single-peaked, especially a Gaussian. Laser light with a single mode can become a stable laser light with an intended intensity even in the case that the spot size of the laser light is converted into a smaller one due to the propagation through the spot-size converter 43. The spot-size converter 43 in the present embodiment includes a lower propagation layer 431 and an upper propagation layer 432. The lower propagation layer 431 has a width in the track width direction (Y-axis direction) that gradually decreases from the width $W_{SC}$ along the traveling direction (−X direction) of laser light incident through the light-receiving end surface 430. The upper propagation layer 432 is stacked on the lower propagation layer 431 and has a width in the track width direction (Y-axis direction) that more steeply decreases from the width $W_{SC}$ along the traveling direction (−X direction) of laser light than the lower propagation layer 431. Laser light incident through the light-receiving end surface 430 is converted to laser light with a smaller spot size as the laser light propagates through the layered structure, and reaches the light-receiving end surface 352 of the waveguide 35.

The width $W_{SC}$ of the spot-size converter 43 at the light-receiving end surface 430 may be in the range of approximately 1 to 10 μm, for example. The thickness $T_{SC}$ (in Z-axis direction) at the light-receiving end surface 430 may be in the range of approximately 1 to 10 μm, for example. The light-receiving end surface 430 is preferably inclined at a predetermined acute angle, for example at an angle of approximately 4° (degrees) with respect to the end surface 400 including the light-emission center 4000 of the laser diode 40. Such angle prevents laser light reflected by the light-receiving end surface 430 from returning to the light-emission center 4000. The spot-size converter 43 is made of a material with a refractive index higher than the refractive index $n_{OC}$ of the constituent material of the surrounding overcoat layer 38. The spot-size converter 43 can be formed from the same dielectric material as the waveguide 35, which will be described below. In the case, the spot-size converter 43 and the waveguide 35 may be formed integrally.

The waveguide 35 in the present embodiment extends in parallel with the element-integration surface 2202 from the light-receiving end surface 352 that receives laser light emitted from the spot-size converter 43 to the end surface 350 on the head end surface 2210 side. Here, the end surface 350 may be a portion of the head end surface 2210, or may be recessed from the head end surface 2210 with a predetermined distance. A portion of one side surface of the waveguide 35 near the end surface 350 faces a surface plasmon generator 36. This allows laser light (waveguide light) incident through the light-receiving end surface 352 and traveling through the waveguide 35 to reach the portion facing the surface plasmon generator 36, thereby to be coupled with the generator 36 in a surface plasmon mode.

As also shown in FIG. 3, in the light source unit 23, the laser diode 40 can be a semiconductor diode of edge-emitting type. The laser diode 40 has a light-emission center 4000 from which laser light for thermal assist is emitted and a rear light-emission center 4001 positioned on the opposite side to the light-emission center 4000. The laser diode 40 is provided in the source-installation surface 2302 of the unit substrate 230 in such a way that the light-emission center 4000 is opposed to the light-receiving surface 430 of the spot-size converter 43. While, the photodiode 55 is of a type in which a light-receiving surface 551 and two electrodes 552 and 553 are provided in the mounting surface (bottom surface) 550. The photodiode 55 is bonded on the rear joining surface 2301 that is on the side opposite to the joining surface 2300 of the unit substrate 230 in such a way that the rear light-emission center 4001 of the laser diode 40 is covered with the light-receiving surface 551. Therefore, the photodiode 55 can detect and monitor the light output of the laser diode 40 in real time, so that the light output can be adjusted with feedback. In this case, the light-receiving surface 551 and the rear light-emission center 4001 can be sufficiently close to each other; thus, the light output of the laser diode 40 can be monitored with high efficiency.

The photodiode 55 detects the rear output of laser light emitted from the rear light-emission center 4001 instead of the front light output of laser light, which is to be adjusted, emitted from the light-emission center 4000. However, in the laser diode 40 of edge-emitting type, the rear output intensity usually has a proportional relation with the front output intensity, and the intensity ratio is set to be in the range, for example, from 2% to 25% depending on the design of the diode structure. Therefore, it becomes possible to monitor the front output from the light-emission center 4000 by detecting the rear output from the rear light-emission center 4001. Furthermore, it becomes possible to perform the feedback adjustment of the light output of the laser diode 40 as a light source for thermal assist by using the monitor output from the photodiode 55. This feedback adjustment enables light output to be adjusted according to variations in light output from the laser diode 40 caused by environmental influences and variations over time in the light output, thereby stabilizing the intensity of NF-light for thermal-assist applied to the magnetic disk 10. As a result, proper heating of a portion to be written of the magnetic disk 10 can be stably achieved.

Further, on the upper surface of the overcoat layer 38 of the slider 22, a pair of terminal electrodes 370 and a pair of terminal electrodes 371 are provided for the magnetic head element 32, formed on the end surface 2211 of the head element part 221. And on the source-installation surface 2302 of the light source unit 23, there are provided: a first lead electrode layer 410 connected electrically to one electrode (n-electrode layer 40a) of the laser diode 40 and one electrode (electrode 552) of the photodiode 55; and a second lead electrode layer 411 connected electrically to the other electrode (electrode 553) of the photodiode 55. Here, the first lead electrode 410 includes a light-source electrode portion 4100 and a lead portion 4101. The laser diode 40 is bonded on the light-source electrode portion 4100 with a solder or the like. Further, provided is a terminal electrode 412 on the other electrode (p-electrode layer 40i) of the laser diode 40. The terminal electrodes 370 and 371, the lead portion 4101 (the first lead electrode layer 410), the second lead electrode layer 411, and the terminal electrode 412 are electrically connected to the connection pads of the wiring members 203 provided on the flexure 201 by wire bonding, by solder ball bonding (SBB) or the like.

The first and second lead electrode layers 410 and 411 may be formed by a foundation layer made of a material such as Ta or Ti with a thickness of approximately 10 nm (nanometers), for example, and a conducting layer made of a conductive material such as Au, Cu, or an alloy of Au with a thickness in the range of approximately 1 to 5 µm, for example. In an alternative, first and second lead electrode layers 410 and 411 may be formed by depositing a solder material such as Au—Sn alloy on the source-installation surface 2302 by an evaporation method, for example.

As also shown in FIG. 3, the slider substrate 220 is, for example, a so-called Femto slider having a thickness (in X-axis direction) $T_{SL}$ of 230 µm, a width $W_{SL}$ of 700 µm in the track width direction (Y-axis direction), and a length $L_{SL}$ (in Z-axis direction) of 850 µm. The Femto slider is commonly used as the substrate of a thin-film magnetic head capable of achieving a high recording density and is the smallest in standardized size among the currently used sliders. On the other hand, the unit substrate 230 is somewhat smaller than the slider substrate 220. However, the width $W_{UN}$ of the unit substrate 230 in the track width direction (Y-axis direction) is larger than the width $W_{LA}$ of the laser diode 40 in the track width direction (Y-axis direction), so that the lead portion 4101 and the second lead electrode layer 411 are exposed in the source-installation surface 2302 even after the laser diode 40 is mounted on the light-source electrode portion 4100. Considering this requirement, the unit substrate 230 may have a thickness $T_{UN}$ (in X-axis direction) of 320 µm, a width $W_{UN}$ in the track width direction of 350 µm, and a length $L_{UN}$ (in Z-axis direction) of 250 µm, for example.

Also in FIG. 3, the unit substrate 230 is preferably made of a material that transmits a laser light used for bonding the light source unit 23 and the slider 22 together, which will be described in detail later. If Nd—YAG laser light (wavelength: 1064 nanometers (nm)), which will be described later, is used, the unit substrate 230 is preferably made of a material that has a transmittance greater than or equal to 50% at a wavelength of 1064 nm, such as Si (transmittance: 67%), GaAs (transmittance: 66%), or SiC (transmittance: 80%). This ensures the bonding between the light source unit 23 and the slider 22 using laser light, which will be described later.

The slider substrate 220 is preferably made of a material that has a lower thermal conductivity than the material of the unit substrate 230 for reasons that will be described later. For example, if the unit substrate 230 is made of Si (thermal conductivity: 168 W/(m·K)), the slider substrate 220 is preferably made of a material such as AlTiC ($Al_2O_3$—TiC) (thermal conductivity: 19.0 W/(m·K)) or $SiO_2$ (thermal conductivity: 10.7 W/(m·K)). This can minimize adverse influence of heat on a magnetic head element 32, the heat being generated by laser irradiation used for bonding between the light source unit 23 and the slider 22.

Further, a solder layer 58, which is an adhesion material layer formed of a material melted and solidified with laser light that has passed through the unit substrate 230, bonds the light source unit 23 and the slider 22 together. The solder layer 58 is preferably made of an alloy containing one element selected from the group consisting of Au (gold), Ag (silver), Cu (copper), Ge (germanium), Al (aluminum) and Mg (magnesium) that has a melting point of lower than 400° C. Here, the solder layer 58 has a higher thermal conductivity than the slider substrate 220, and heat generated by laser irradiation can be used more in melting the solder layer 58 than being conducted to the slider substrate 220. The thickness of the solder layer 58 may be in the range of approximately 0.05 to 5.0 μm, for example.

As described above, the thermally-assisted magnetic recording head 21 has the structure in which the slider 22 and the light source unit 23 are interconnected. Thus, the slider 22 and the light source unit 23 can be separately fabricated and then combined together to fabricate the head 21. Consequently, the production yield of the entire heads is about the same as the production yield of the sliders 22 if performance evaluation of the light source units 23 is performed prior to the fabrication of the heads and only good light source units 23 are used for the fabrication of the heads. Thus, the reduction of production yield of the entire heads due to the rejection rate of the laser diodes 40 can be avoided. Here, the performance of the light source units 23 is influenced by the positional relation between the laser diode 40 and the photodiode 55 as well as each of the operation characteristics of laser diode 40 and photodiode 55. Thus, by checking the items that has a possibility to significantly affect the production yield in the upstream of manufacturing process and selecting the light source unit 23, degradation in production yield of heads 21 can be avoided.

Furthermore, since the light source unit 23 is attached to the back surface 2201 of the slider 22 which is opposite to the ABS 2200 of the slider 22, the laser diode 40 can be always disposed in a location far from the ABS 2200. As a result, direct mechanical impact on the laser diode 40 and photodiode 55 in operation can be avoided. Moreover, since the ABS 2200 of the slider 22 is perpendicular to the element-integration surface 2202, the slider 22 has a high affinity for conventional thin-film magnetic head fabrication processes. Since an optical part that requires a considerably high accuracy such as an optical pickup lens or an optical part that requires a special structure for connection such as an optical fiber do not need to be provided in the thermally-assisted magnetic recording head 21, the number of man-hours and thus costs can be reduced.

Figure 4:
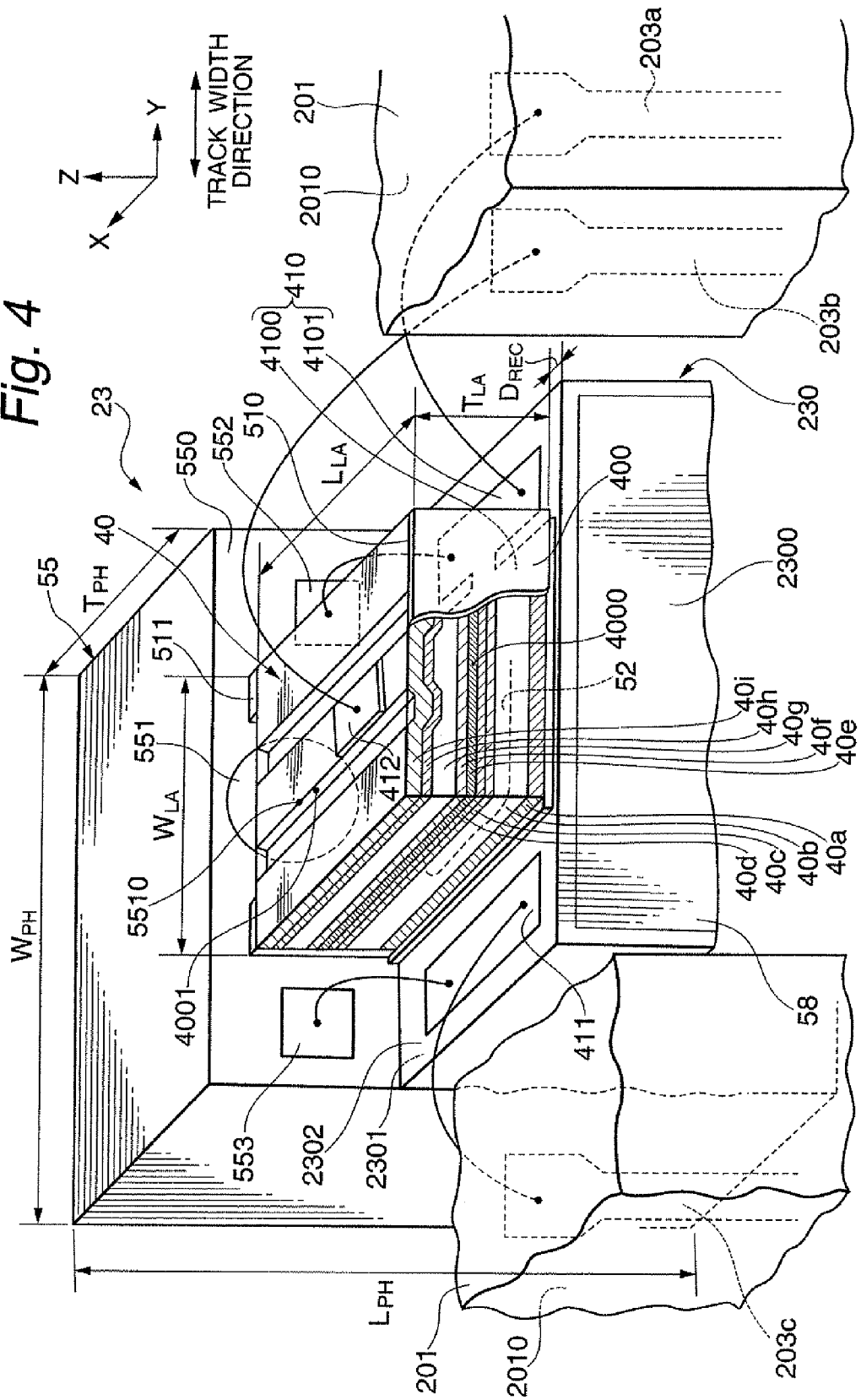
FIG. 4 shows a perspective view illustrating the structure of the laser diode and the state of joining the laser diode to the unit substrate.

FIG. 4 shows a perspective view illustrating the structure of the laser diode 40 and the state of joining the laser diode 40 to the unit substrate 230.

According to FIG. 4, the laser diode 40 is of edge-emitting type. As the laser diode 40, InP base, GaAs base or GaN base diodes can be utilized, which are usually used for communication, optical disk storage, or material analysis. The wavelength $\lambda_L$ of the emitted laser light may be, for example, in the range of approximately 375 nm to 1.7 μm. For example, a laser diode of InGaAsP/InP quaternary mixed crystal can be used, in which possible wavelength region is set to be from 1.2 to 1.67 μm. Here, the laser diode 40 shown in FIG. 4 has a multilayered structure in which sequentially stacked from the unit substrate 230 side is: an n-electrode layer 40a being opposed to and bonded with the light-source electrode portion 4100 of the first lead electrode layer 410; an n-GaAs substrate 40b; an n-InGaAlP clad layer 40c; the first InGaAlP guide layer 40d; an active layer 40e formed of multiquantum well (InGaP/InGaAlP) or the like; the second InGaAlP guide layer 40f; an p-InGaAlP clad layer 40g; a p-electrode base layer 40h; and a p-electrode layer 401. The n-electrode layer 40a and the p-electrode layer 40i may be formed of, for example, Au or Au alloy with thickness of approximately 5 μm.

Further, on the front and rear cleaved surfaces of the multilayered structure of the laser diode 40, respectively formed are reflective layers 510 and 511 for exciting the oscillation by total reflection. The outer surface of the reflective layer 510 on the joining surface 2300 side is a light-emission surface 400 which includes a light-emission center 4000 at the position of the active layer 40e. The terminal electrode 412 may be a conducting layer formed on the p-electrode layer 40i of the laser diode 40 and made of such as Au, Cu, or an Au alloy with a thickness of, for example, 1 to 5 μm. By applying a predetermined voltage between the p-electrode layer 40i and the n-electrode layer 40a of the laser diode 40 through the terminal electrode 412 and the first lead electrode layer 410, the laser diode 40 oscillates and emits laser light from its light-emission center 4000 and rear light-emission center 4001. The laser diode 40 has a width $W_{LA}$ of, for example, approximately 150 to 250 μm. The length $L_{LA}$ of the laser diode 40 corresponds approximately to a cavity length that is the distance between the reflective layers 510 and 511, and is, for example, 300 μm. The length $L_{LA}$ is preferably 300 μm or more in order to obtain a sufficient high output. Further, the height $T_{LA}$ of the laser diode 40 is, for example, approximately 60 to 200 μm.

Referring also to FIG. 4, a photodiode 55 is bonded to the rear joining surface 2301 of the unit substrate 230 in such a manner that the rear light-emission center 4001 of the laser diode 40 is covered with the light-receiving surface 551. Two electrodes 552 and 553 of the photodiode 55 are exposed and are electrically connected to the lead portion 4101 (the first lead electrode layer 410) and the second lead electrode layer 411, respectively, by a method such as wire bonding or SBB. The lead portion 4101, the terminal electrode 412, and the second lead electrode 411 are electrically connected to wiring members 203a, 203b and 203c by a method such as wire bonding or SBB. The wiring member 203a may be a ground wire (connected to ground) and the wiring members 203b and 203c may be connected to the positive electrode of a power supply. The two electrodes 552 and 553 of the photodiode 55 are a p-electrode and an n-electrode, respectively. According to the design of lead electrodes on the unit substrate 230 of the present embodiment, the laser diode 40 can be supplied with electric power, and monitor output can be taken from the photodiode 55 in a simple and reliable manner.

The length $L_{PH}$ of the photodiode 55 is greater than or equal to the sum of the length $L_{UN}$ (FIG. 3) of the unit substrate 230 and the thickness $T_{LA}$ of the laser diode 40, for example in the range of approximately 350 to 500 μm, according to a method for forming the light source unit 23, which will be described later with reference to FIGS. 8a to 8e. The width $W_{PH}$ of the photodiode 55 is equal to the width $W_{UN}$ (FIG. 3) of the unit substrate 230 according to the method for forming the light source unit 23, which will be described later with reference to FIGS. 8a to 8e. The height $T_{PH}$ of the photodiode 55 can be in the range of approximately 50 to 150 μm, for example.

As has been described above, the laser diode 40 is preferably disposed in such a manner that the n-electrode layer 40a is positioned at the bottom and is bonded to the light-source electrode portion 4100 of the first lead electrode layer 410. In edge-emitting laser diodes in general, the rear light-emission center 4001 (light-emission center 4000) is closer to the p-electrode layer 40i than the n-electrode layer 40a in the direction in which the layers are stacked (Z-axis direction). Accordingly, by positioning the electrode layer 40a at the bottom, the distance (in Z-axis direction) between the rear light-emission center 4001 (light-emission center 4000) and the source-installation surface can be set to a larger value. Consequently, the position of the light-receiving surface 551 of the photodiode 55 can be designed in such a manner that laser light emitted with its emitting center in the rear light-emission center 4001 can be sufficiently incident on the light-receiving surface 551 of the photodiode 55 which is exposed from the unit substrate 230. In addition, according to the present invention, output from the rear light-emission center 4001 of the laser diode 40 can be monitored with a high efficiency because the rear light-emission center 4001 of the laser diode 40 can be positioned sufficiently closer to the light-receiving surface of the photodiode 55.

An electric source provided within the magnetic disk apparatus can be used for driving the laser diode 40. In fact, the magnetic disk drive apparatus usually has an electric source with applying voltage of, for example, approximately 2 to 5V, which is sufficient for the laser oscillation. Even in the case that the amount of electric power consumption of the laser diode 40 is, for example, in the vicinity of one hundred mW, the amount can be covered sufficiently by the electric source provided within the magnetic disk apparatus.

Referring again to FIG. 4, the n-electrode layer 40a of the laser diode 40 and the light-source electrode portion 4100 of the unit substrate 230 can be bonded to each other by soldering using one of lead-free solders such as Au—Sn alloy 52. Here, preferably the laser diode 40 is bonded onto the unit substrate 230 in such a way that the distance $D_{REC}$ (in X-axis direction) between the light-emitting surface 400 of the laser diode 40 and the joining surface 2300 is 0 or more, and 5 µm or less. Since the distance $D_{REC}$ is greater than or equal to 0, the laser diode 40 does not protrude from the light source unit 23. Consequently, the laser diode 40 is prevented from being subjected to excessive mechanical stress and damage during bonding. Furthermore, since the direction $D_{REC}$ is less than or equal to 5 µm, the distance between the light-emission center 4000 and the light-receiving end surface 430 of the optical system 31 (FIG. 3) of the slider 22 is sufficiently small and therefore a high light use efficiency can be provided.

Figure 5:
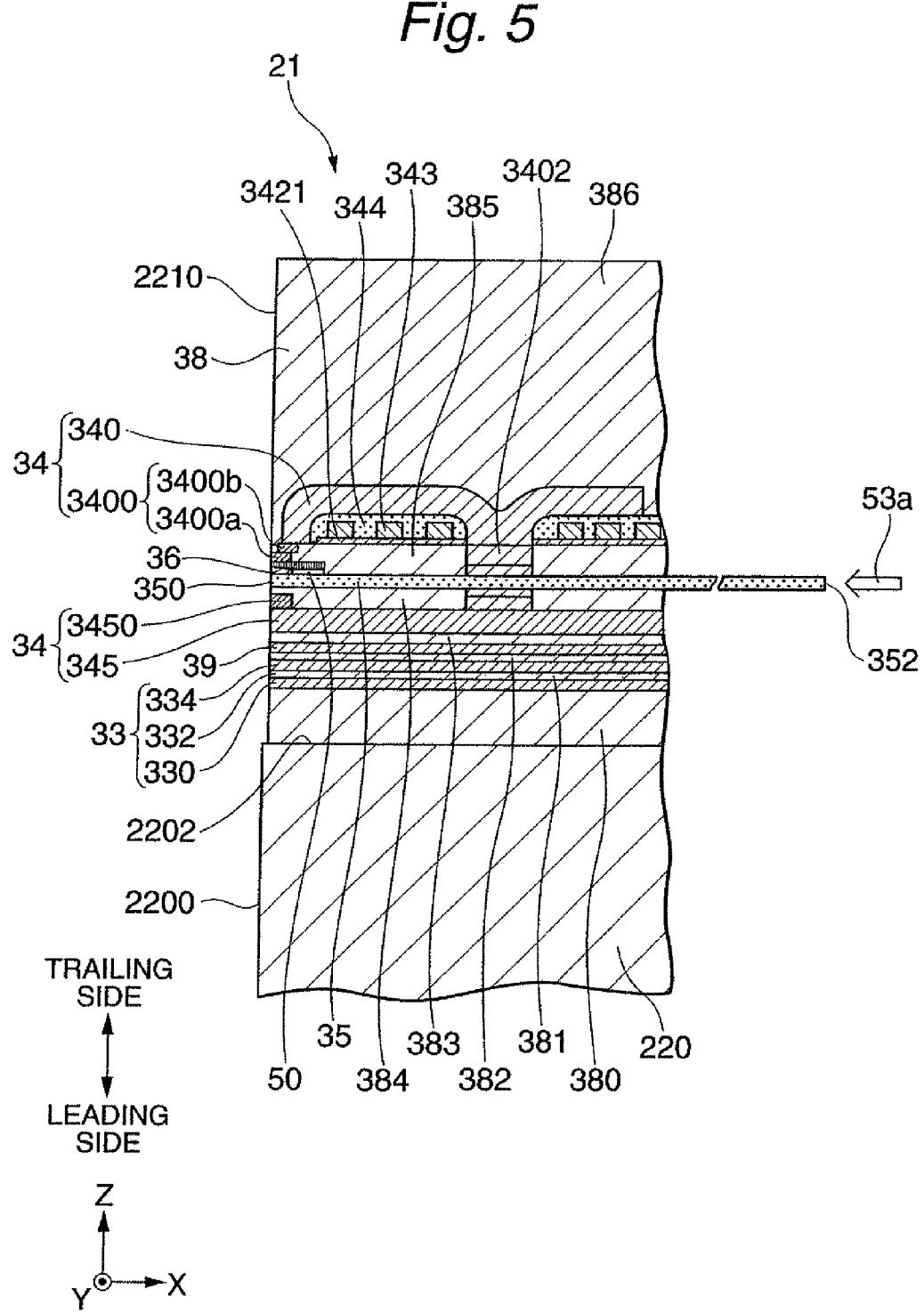
FIG. 5 shows a cross-sectional view taken by plane A in FIG. 3, schematically illustrating the configuration of the head element and its vicinity in the thermally-assisted magnetic recording head according to the present invention.

FIG. 5 shows a cross-sectional view taken by plane A in FIG. 3, schematically illustrating the configuration of the head element 32 and its vicinity in the thermally-assisted magnetic recording head 21.

As shown in FIG. 5, the MR element 33 is formed on a base layer 380 that is formed of an insulating material such as $Al_2O_3$ (alumina), $SiO_2$ and stacked on the element-integration surface 2102. The MR element 33 includes: an MR multilayer 332; and a lower shield layer 330 and an upper shield layer 334 which sandwich the MR multilayer 332 and an insulating layer 381 therebetween. The MR multilayer 332 is a magneto-sensitive part for detecting signal magnetic field by utilizing MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. In the case that the MR multilayer 332 is a CPP-GMR multilayer or a TMR multilayer, the upper and lower shield layers 334 and 330 act as electrodes as well as magnetic shields.

Referring also to FIG. 5, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk 10 (FIG. 1), the magnetic flux being excited by write current flowing through the write coil layer 343. The main magnetic pole 3400 includes: a first main pole portion 3400a reaching the head end surface 2210 and having a small width $W_P$ (FIG. 6) in the track width direction; and a second main pole portion 3400b located on the first main pole portion 3400a and at the rear (+X side) of the portion 3400a. The first main pole portion 3400a has an end surface 3400e (FIG. 6) with a shape of, for example, a rectangle, a square or a trapezoid on the head end surface 2210. Here, the above-described width $W_P$ is the length of an edge in the track width direction (Y-axis direction) of the end surface 3400e, and defines the width of write field distribution in the track width direction (Y-axis direction). The width $W_P$ can be set to be, for example, 0.05 to 0.5 µm. The main magnetic pole 3400 is preferably formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the first main pole portion 3400a is, for example, in the range of approximately 0.1 to 0.8 µm.

The write coil layer 343 is formed on an insulating layer 385 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment; however, may have a two or more layered structure or a helical coil shape. Further, the number of turns of the write coil layer 343 is not limited to that shown in FIG. 5, and may be, for example, in the range from two to seven.

The back contact portion 3402 has a though-hole extending in X-axis direction, and the waveguide 35 and insulating layers that covers the waveguide 35 pass through the though-hole. In the though-hole, the waveguide 35 is away at a predetermined distance of, for example, at least 1 µm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material, and its thickness is, for example, approximately 0.5 to 5 µm. Further, the lower shield 3450 is a part of the magnetic path, being connected with the lower yoke layer 345 and reaching the head end surface 2210. The lower shield 3450 is opposed to the main magnetic pole 3400 through the surface plasmon generator 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the first main pole portion 3400a to become steeper. As a result, jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

Referring also to FIG. 5, laser light 53a, the spot size of which the spot-size converter 43 changes (reduces), enters the waveguide 35 from the light-receiving end surface 352, and propagates through the waveguide 35. The waveguide 35 extends from the light-receiving end surface 352 to the end surface 350 on the head end surface 2210 side through the through-hole that is provided in the back contact portion 3402 and extends in X-axis direction. Furthermore, the surface plasmon generator 36 is a near-field light generator (NFL-generator) that transforms the laser light (waveguide light) propagating through the waveguide 35 into NF-light. A part on the head end surface 2210 side of the waveguide 35 and the surface plasmon generator 36 are provided between the lower shield 3450 (lower yoke layer 345) and the main magnetic pole 3400 (upper yoke layer 340). Further, a portion of the upper surface (side surface) of the waveguide 35 on the head end surface 2210 side is opposed to a portion of the lower surface (including a propagative edge 360 (FIG. 6)) of the surface plasmon antenna 36 with a predetermined distance. The sandwiched portion between these portions constitutes a buffering portion 50 having a refractive index lower than that of the waveguide 35. The buffering portion 50 acts for coupling the laser light (waveguide light) that propagates through the waveguide 35 with the surface plasmon generator 36 in a surface plasmon mode. A detailed explanation of the waveguide 35, the buffering portion 50 and the surface plasmon generator 36 will be given later with reference to FIG. 6.

Further, also as shown in FIG. 5, an inter-element shield layer 39 is preferably provided between the MR element 33 and the electromagnetic transducer 34 (lower yoke layer 345), sandwiched by the insulating layers 382 and 383. The inter-element shield layer 39 plays a role for shielding the MR element 33 from the magnetic field generated from the electromagnetic transducer 34, and may be formed of a soft-magnetic material. Here, the above-described insulating layers 381, 382, 383, 384, 385 and 386 constitute the overcoat layer 38.

Figure 6:
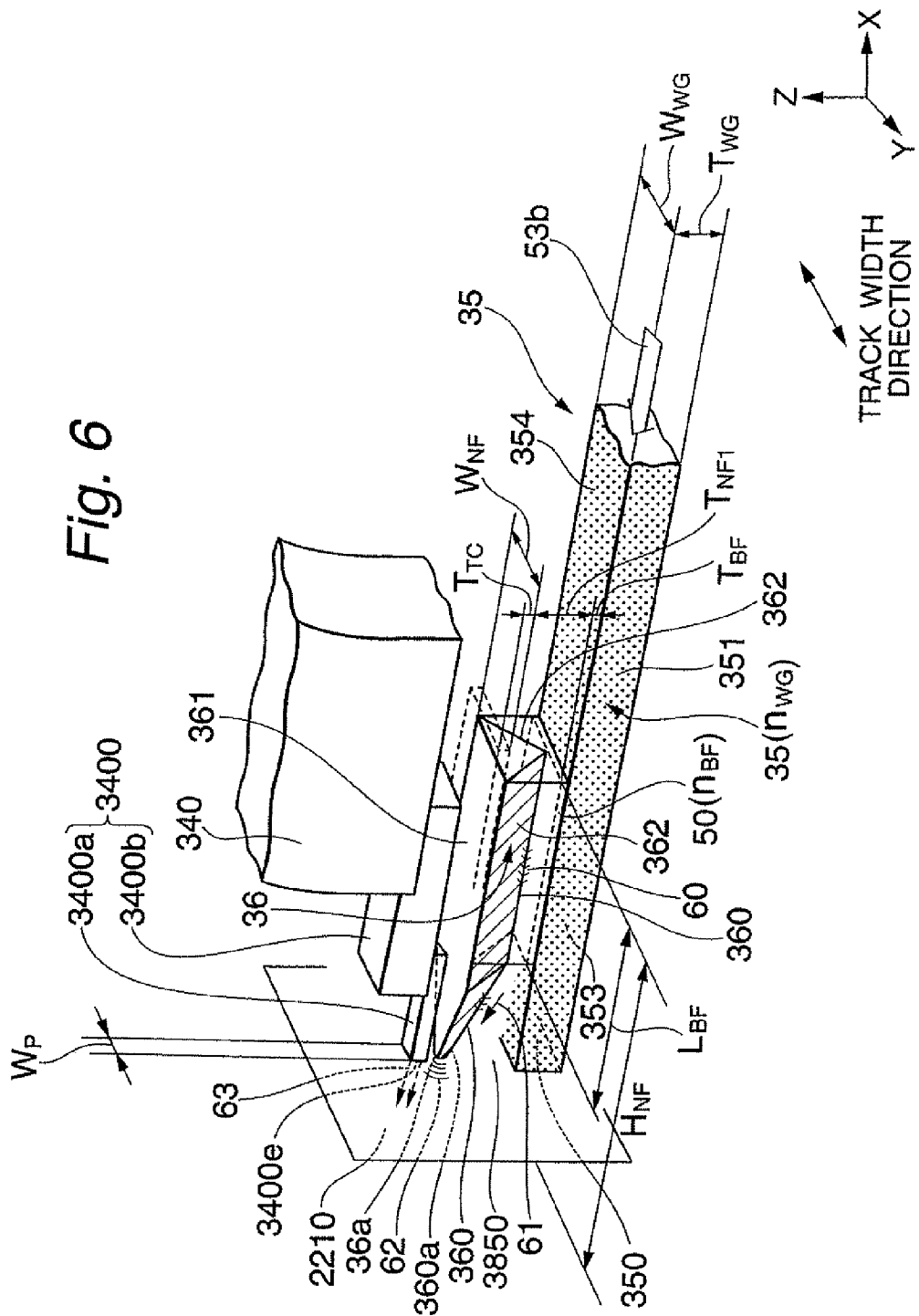
FIG. 6 shows a perspective view schematically illustrating the configuration of the waveguide, the surface plasmon generator and the main magnetic pole.

FIG. 6 shows a perspective view schematically illustrating the configuration of the waveguide 35, the surface plasmon generator 36 and the main magnetic pole 3400. In the figure, the head end surface 2210 is positioned at the left side, the surface 2210 including positions where write field and NF-light are emitted toward the magnetic recording medium.

As shown in FIG. 6, the configuration includes the waveguide 35 for propagating laser light (waveguide light) 53b used for generating NF-light toward the end surface 350, and the surface plasmon generator 36 that has a propagative edge 360 as an edge on which surface plasmon excited by the laser light (waveguide light) 53b propagates. The surface plasmon generator 36 further includes a near-field light generating (NFL-generating) end surface 36a that reaches the head end surface 2210 and is a destination for the excited surface plasmon. The propagative edge 360 extents to the NFL-generating end surface 36a. Further, a buffering portion 50 is a portion sandwiched between a portion of the side surface 354 of the waveguide 35 and a portion of the lower surface 362 including the propagative edge 360 of the surface plasmon generator 36. That is, the propagative edge 360 is covered with the buffering portion 50. The buffering portion 50 acts for coupling the waveguide light 53b with the surface plasmon generator 36 in a surface plasmon mode. Further, the propagative edge 360 plays a role of propagating the surface plasmon excited by the waveguide light 53b to the NFL-generating end surface 36a. Here, side surfaces of the waveguide 35 are defined as, out of end surfaces surrounding the waveguide 35, end surfaces other than the end surface 350 on the head end surface 2210 side and the light-receiving end surface 352 on the opposite side. These side surfaces serve as surfaces on which the propagating waveguide light 53b can be totally reflected in the waveguide 35 that corresponds to a core. In the present embodiment, the side surface 354 of the waveguide 35, a portion of which is in surface contact with the buffering portion 50, is the upper surface of the waveguide 35. And, the buffering portion 50 may be a portion of the overcoat layer 38 (FIG. 2), or may be provided as a new layer other than the overcoat layer 38.

Specifically, the waveguide light 53b, which has advanced to near the buffering portion 50, is involved with the optical configuration including the waveguide 35 with a refractive index $n_{WG}$, the buffering portion 50 with a refractive index $N_{BF}$ and the surface plasmon generator 36 made of a metal, and induces a surface plasmon mode on the propagative edge 360 of the surface plasmon generator 36. That is, the waveguide light couples with the surface plasmon generator 36 in a surface plasmon mode. The induction of the surface plasmon mode becomes possible by setting the refractive index $n_{BF}$ of the buffering portion 50 to be smaller than the index $n_{WG}$ of the waveguide 35 ($n_{BF}<n_{WG}$). Actually, evanescent light is excited within the buffering portion 50 under an optical boundary condition between the waveguide 35 as a core and the buffering portion 50. Then, the evanescent light couples with the fluctuation of electric charge excited on the metal surface (propagative edge 360) of the surface plasmon generator 36, and induces the surface plasmon mode, thereby there is excited surface plasmon 60. Here, the propagative edge 360 is located closest to the waveguide 35 on the inclined lower surface 362 of the surface plasmon generator 36, and is just an edge where electric field tends to converge; thus surface plasmon can easily be excited on the edge 360. The propagative edge 360 is preferably made rounded to prevent surface plasmon 60 from running off from the edge 360, and thus to prevent the degradation of light use efficiency.

In the light source and optical system as shown in FIGS. 3, and 6, the laser light emitted from the light-emission surface 400 of the laser diode 40 preferably has TM-mode polarization in which the oscillation direction of electric field of the laser light is along Z-axis. Further, the waveguide light 53b accordingly have a linear polarization in which the oscillation direction of electric field of the laser light is Z-axis direction, that is, perpendicular to the layer surface of the waveguide 35. Setting the polarization enables the waveguide light 53b propagating through the waveguide 35 to be coupled with the surface plasmon generator 36 in a surface plasmon mode.

Further, as also shown in FIG. 6, the surface plasmon generator 36, in the present embodiment, tapers in the height direction (Z-axis direction) near the head end surface 2210 toward the NFL-generating end surface 36a. Further, the surface plasmon generator 36 has, in the present embodiment, a cross-section taken by YZ plane with a triangular shape, and the NFL-generating end surface 36a especially has an isosceles triangle shape in which one apex on the leading side (−Z side) is the end of the propagative edge 360. Thus, surface plasmon 60 propagating on the propagative edge 360 reaches the NFL-generating end surface 36a having an apex 360a as a destination of the edge 360. As a result, the surface plasmon 60, namely, electric field converges in the NFL-generating end surface 36a. Thereby NF-light 62 is emitted from the end surface 36a toward the magnetic recording layer of the magnetic disk 10, and reaches the surface of the magnetic disk 10 to heat a portion of the magnetic recording layer of the disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, the thermally-assisted magnetic recording can be accomplished.

Further, the side surfaces of the waveguide 35: the upper surface 354, the lower surface 353, and both the side surfaces 351 in the track width direction (Y-axis direction) have a surface contact with the overcoat layer 38 (FIG. 3), that is, the insulating layers 384 and 385 (FIG. 5), except a portion having a surface contact with the buffering portion 50. Here, the waveguide 35 is formed of a material with a refractive index $n_{WG}$ higher than the refractive index $n_{OC}$ of the constituent material of the overcoat layer 38, made by using, for example, a sputtering method. This material design causes the waveguide 35 to act as a core, and causes the overcoat layer 38 to act as a clad. For example, in the case that the wavelength $\lambda_L$ of the laser light is 600 nm and the overcoat layer 38 is formed of $Al_2O_3$ (n=1.63), the waveguide 35 can be formed of, for example, $SiO_XN_Y$ (n=1.7-1.85) or $Ta_2O_5$ (n=2.16). Further, in the present embodiment, the waveguide 35 has a cross-section taken by YZ-plane of a rectangular or trapezoidal shape. The width $W_{WG}$ in the track width direction (Y-axis direction) of a portion of the waveguide 35 near the end surface 350 on the head end surface 2210 side may be, for example, in the range approximately from 0.3 to 0.7 μm. Further, the thickness $T_{WG}$ (in Z-axis direction) of the waveguide 35 may be, for example, in the range approximately from 0.3 to 0.7 μm.

The buffering portion 50 is formed of a dielectric material having a refractive index $n_{BF}$ lower than the refractive index $n_{WG}$ of the waveguide 35. For example, when the wavelength $\lambda_L$ of the laser light is 600 nm and the waveguide 35 is formed of $Ta_2O_5$ (n=2.16), the buffering portion 50 can be formed of $SiO_2$ (n=1.46) or $Al_2O_3$ (n=1.63). Further, the length $L_{BF}$ (in X-axis direction) of the buffering portion 50, namely, the length of a portion sandwiched between the side surface 354 of the waveguide 35 and the propagative edge 360, is preferably in the range of 0.5 to 5 μm, and is preferably larger than the wavelength $\lambda_L$ of the laser light 53b. Further, the thickness $T_{BF}$ (in Z-axis direction) of the buffering portion 50 is preferably in the range of 10 to 200 nm.

The surface plasmon generator 36 is preferably formed of a conductive material of, for example, a metal such as Ag, Au, pd, Pt, Rh, Ir, Ru, Cu or Al, or an alloy made of at least two of these elements, especially an alloy with Ag as a main component. Further, the surface plasmon generator 36 can have a width $W_{NF}$ in the track width direction (Y-axis direction) of the upper surface 361, the width $W_{NF}$ being sufficiently smaller than the wavelength of the laser light 53b, and being in the range of, for example, approximately 10 to 100 nm. And the surface plasmon generator 36 can have a thickness $T_{NF1}$ (in Z-axis direction) sufficiently smaller than the wavelength of the laser light 53b, the thickness $T_{NF1}$ being in the range of, for example, approximately 10 to 100 nm. Further, the length (height) $H_{NF}$ (in X-axis direction) can be set to be in the range of, for example, approximately 0.8 to 6.0 μm.

The optical system that is provided in the head element part 221 and generates light for thermal assist is not limited to the above-described one. For example, as an alternative, there can be available an optical system that use a NF-light generator having another shape and structure, or an optical system in which a plasmon antenna made of a metal piece is provided at the end of a waveguide.

FIG. 7a shows a cross-sectional view taken by ZX plane, schematically illustrating the arrangement of the photodiode 55, the laser diode 40 and the optical system 31 in the thermally-assisted magnetic recording head 21. FIG. 7b shows a cross-sectional view taken by XY plane, schematically illustrating the structure of the photodiode 55.

Referring to FIG. 7a, in the optical configuration of the thermally-assisted magnetic recording head 21, the light-receiving center 5510 in the light-receiving surface 551 of the photodiode 55, the rear light-emission center 4001 of the laser diode 40, the light-emission center 4000 of the laser diode 40, and the light-receiving center 4300 in the light-receiving end surface 430 of the spot-size converter 43 are located substantially in a straight line 70. In addition, a surface plasmon generator 36 is also disposed in or near the straight line 70. The surface plasmon generator 36 generates NF-light for thermal assist from its NFL-generating end surface 36a that extends to the head end surface 2210 on the ABS 2200 side.

Since a series of optical components are disposed substantially in line in the head 21, a highly efficient configuration is achieved in which loss in light from the light source is minimized. That is, NF-light for thermal assist that is generated from the surface plasmon generator 36 and has a sufficient intensity, and monitor output from the photodiode 55 that has a required intensity, can be obtained with a high efficiency. The head 21 has a construction in which a slider 22, a unit substrate 230 and laser diode 40, and a photodiode 55 are stacked in X-axis direction in this order. It is known that in order to improve the flying stability of the head 21 having such construction and to reduce the thickness of the HGA 17 (FIG. 2) containing the head 21 to reduce the thickness of the magnetic disk apparatus, it is preferable that the distance $(T_{PN}+D_{PLN})$ (in X-axis direction) between the surface 555 of the photodiode 55 that is on the side opposite to the light-receiving surface 551 and the NFL-generating end surface 36a of the surface plasmon generator 36 which extends to the head end surface 2210 be less than or equal to 700 μm. Here, $T_{PH}$ is the height of the photodiode 55, and $D_{PLN}$ is the distance (in X-axis direction) between the light-receiving center 5510 of the photodiode 55 and the NFL-generating end surface 36a of the surface plasmon generator 36.

Referring to FIG. 7b, the photodiode 55 is a diode including a PN junction of p-type silicon and n-type silicon, for example. The photodiode 55 in the present embodiment includes a p-type semiconductor layer 55a, an n-type semiconductor layer 55b which forms a PN junction with the p-type semiconductor layer 55a, an insulating layer 55c, an electrode 552 passing through the insulating layer 55c and is electrically connected to the p-type semiconductor layer 55a, and an electrode 553 passing through the insulating layer 55c and is electrically connected to the n-type semiconductor layer 55b. When the PN junction formed by the p-type semiconductor layer 55a and the n-type semiconductor layer 55b is irradiated with light propagating through the light-receiving surface 551, a quantity of electron-hole pairs that is dependent on the amount of light is generated and the electrons flow into the n-type semiconductor layer 55b and the holes flow into the p-type semiconductor layer 55a. As a result, photovoltaic power that is dependent on the amount of incident light is generated between the electrodes 552 and 553. By measuring the photovoltaic power or by connecting a load between the electrodes 552 and 553 to measure a current flowing through the load, a monitor output from the photodiode 55 can be obtained.

FIGS. 8a to 8e show perspective views schematically illustrating an embodiment of a method for manufacturing the light source unit 23 according to the present invention.

Figure 8A:
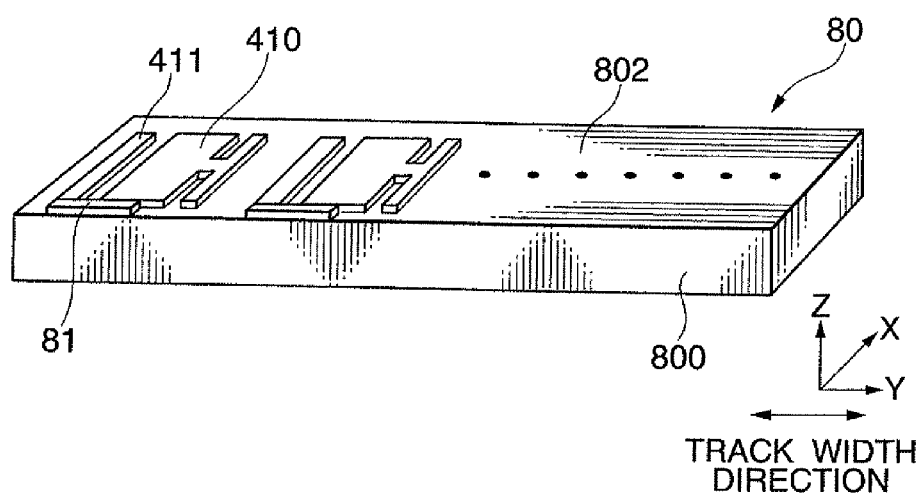
FIGS. 8a to 8e show perspective views schematically illustrating an embodiment of a method for manufacturing the light source unit according to the present invention.

According to the embodiment illustrated in FIG. 8a, multiple pairs of first and second lead electrode layers 410 and 411 are formed first on the source-installation surface 802 of a light-source-unit row bar 80 by using a sputtering method, a photolithography method, a milling method and so on. The light-source-unit row bar 80 is a bar which is to be cut into unit substrates 230. A bank layer 81 is formed in a region on the source-installation surface 802 of the light-source-unit row bar 80 and in front of at least each of the regions between the first and second lead electrode layers 410 and 411 when viewed from the joining surface 800 side, by using a sputtering method, a photolithography method, a milling method and so on. The bank layer 81 is a wrapping-around-prevention layer for preventing formation of a conductive layer between the first and second lead electrode layers 410 and 411 to short-circuit the first and second lead electrode layers 410 and 411 during formation of a solder layer 58 (FIGS. 3 and 4) which is a layer made of material for adhesion, as will be described below with reference to FIG. 8b. The bank layer 81 can be made of the same material as the first and second lead electrode layers 410 and 411, for example, or other conductive or insulating material. Preferably, the bank layer 81 is thicker than the first and second lead electrode layers 410 and 411 in order to prevent the wrapping-around more reliably.

Figure 8B:
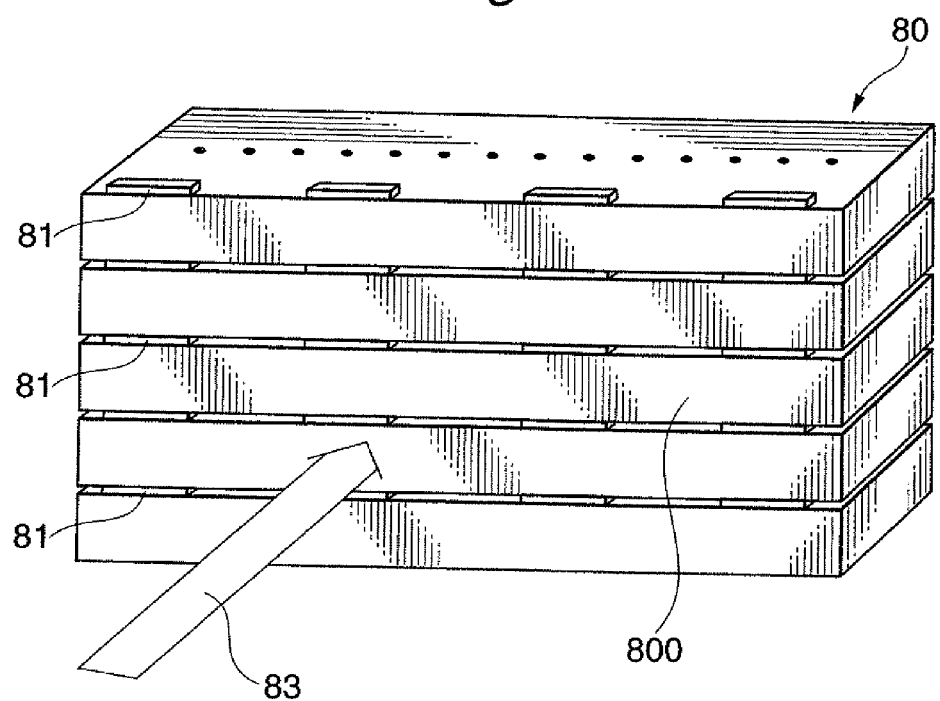

Then, as shown in FIG. 8b, multiple light-source-unit row bars 80 on which sets of first and second lead electrode layers 410 and 411 and bank layer 81 are formed are stacked on top of one another in such a manner that the multiple sets formed are sandwiched between the adjacent light-source-unit row bars 80 and their joining surfaces 800s are aligned on the same side. As a result, the aligned joining surfaces 800 are arranged with the bank layers 81 sandwiched between them when viewed from the joining surface 800 side. Then, a conductive material is deposited on the joining surfaces 800 of the stacked light-source-unit row bars 80 to form a solder layer 58 (FIG. 8c), which is an adhesion material layer for connecting to the slider 22, while using the bank layers 81 to prevent the conductive material from depositing at least between the first and second lead electrode layers 410 and 411.

To form the solder layer 58, preferably an alloy 83 containing one element selected from the group consisting of Au, Ag, Cu, Ge, Al and Mg that has a melting point less than 400° C. is deposited on the joining surfaces 800 of the stacked multiple light-source-unit row bars 80 by using, for example, a sputtering method or a vapor deposition method. The alloy is more preferably Au—Si, Au—Ge (germanium), Au—Sn (tin), Ag—Sn, Cu—Sn, Ge—Zn, Al—Sn, Al—Zn, Mg—Sn or Mg—Zn alloy. By forming the solder layer 58 of such a conductive material, the light source unit 23 and the slider 22 can be bonded together by melting the solder layer 58 through the use of laser light, as will be described below with reference to FIG. 9b.

Figure 8C:
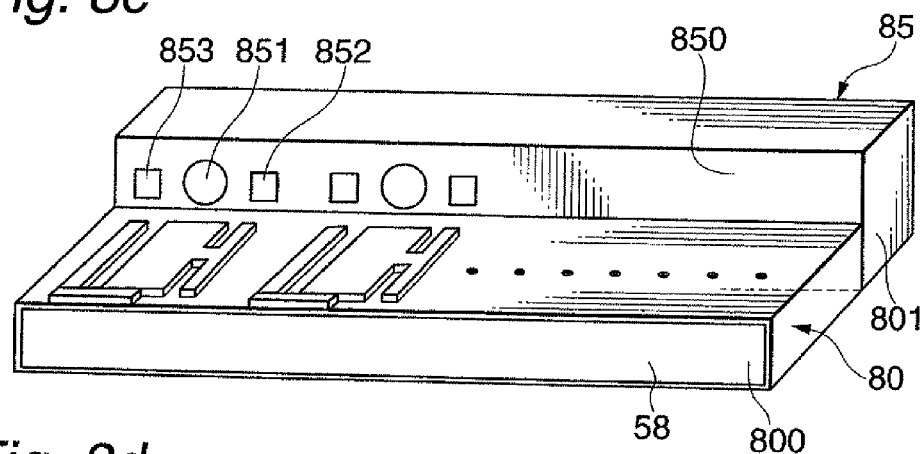

Then, as shown in FIG. 8c, a photodiode row bar 85 is bonded to the rear joining surface 801 of the light-source-unit row bar 80 that is on the side opposite to the joining surface 800 in such a manner that the multiple light-receiving surfaces 851 and multiple pairs of electrodes 852 and 853 are positioned on the light-source-unit row bar 80 side and exposed. An adhesive made of an organic material such as an epoxy-based resin, for example, can be used for the bonding. The photodiode row bar 85 is a structure to be cut into pieces each of which is a photodiode 55.

Figure 8D:
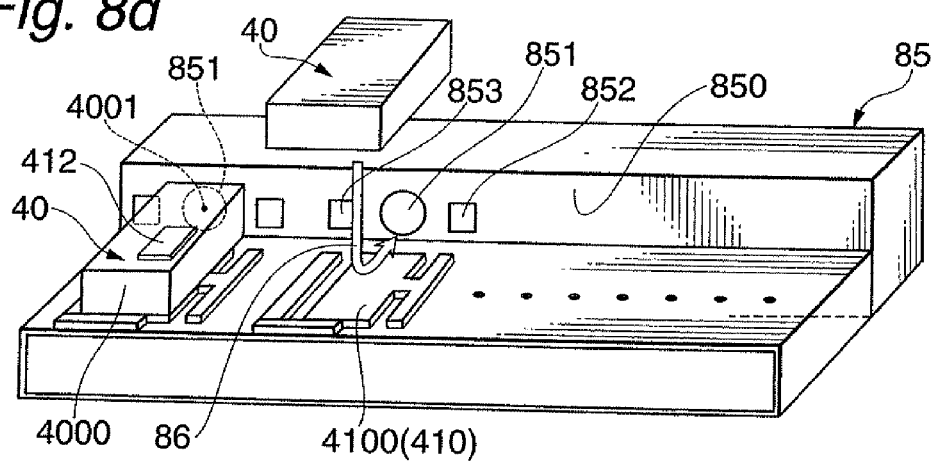
Figure 8E:
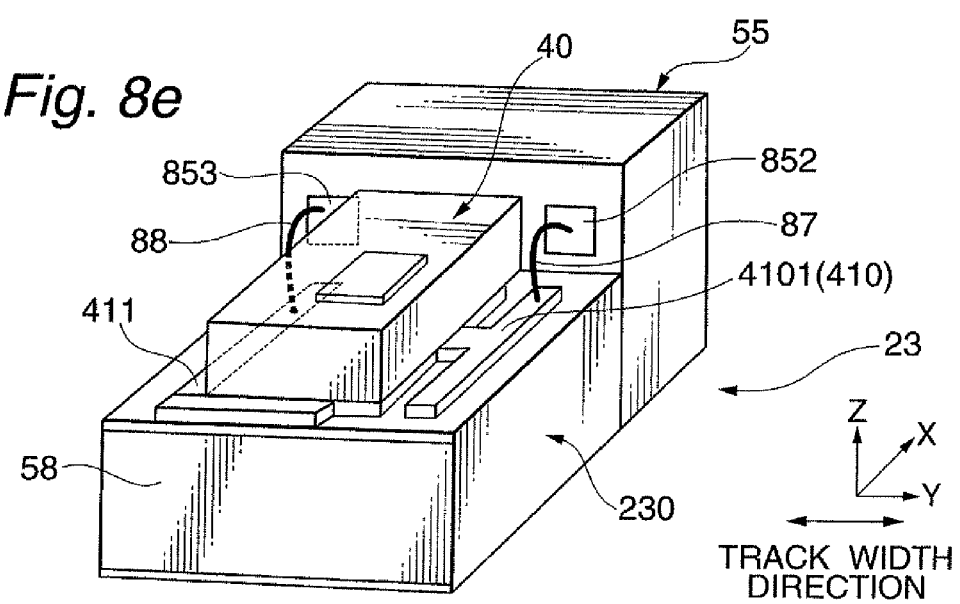

Then, as shown in FIG. 8d, multiple laser diodes 40 are positioned by butting them against the photodiode row bar 85, as indicated by arrow 86, with each of the multiple laser diodes 40 being placed on the first lead electrode layer 410, the n-electrode layer 40a of the laser diode 40 being at the bottom so that the light-receiving surface 850 of the photodiode row bar 85 covers the rear light-emission center 4001 of each laser diode 40. In doing this, the position of each laser diode 40 is determined so that the rear light-emission center 4001 of the laser diode 40 faces an appropriate position in the light-receiving surface 851 of the photodiode row bar 85. The positioned laser diodes 40 are then bonded to the light-source-unit row bar 80. The bonding can be accomplished by depositing an evaporation film of an alloy such as Au—Sn on the lead portions 4101 beforehand, placing the laser diodes 40 on the deposited film, and then heating them with a hotplate or the like under a hot-air blower to approximately 200 to 300° C.

Then, as illustrated in FIG. 8d, the light-source-unit row bar 80 to which the photodiode row bar 85 and the multiple laser diodes 40 are bonded is cut into light source units 23. In each of the cut light source units 23, the electrodes 852 and 853 are electrically connected to the lead portion 4101 (the first lead electrode layer 410) and the second lead electrode layer 411, respectively, through wires 87 and 88, respectively. Alternatively, the connection can be accomplished by using SBB as well. Thus, manufacturing of the light source unit 23 according to the present invention is completed.

Figure 9:
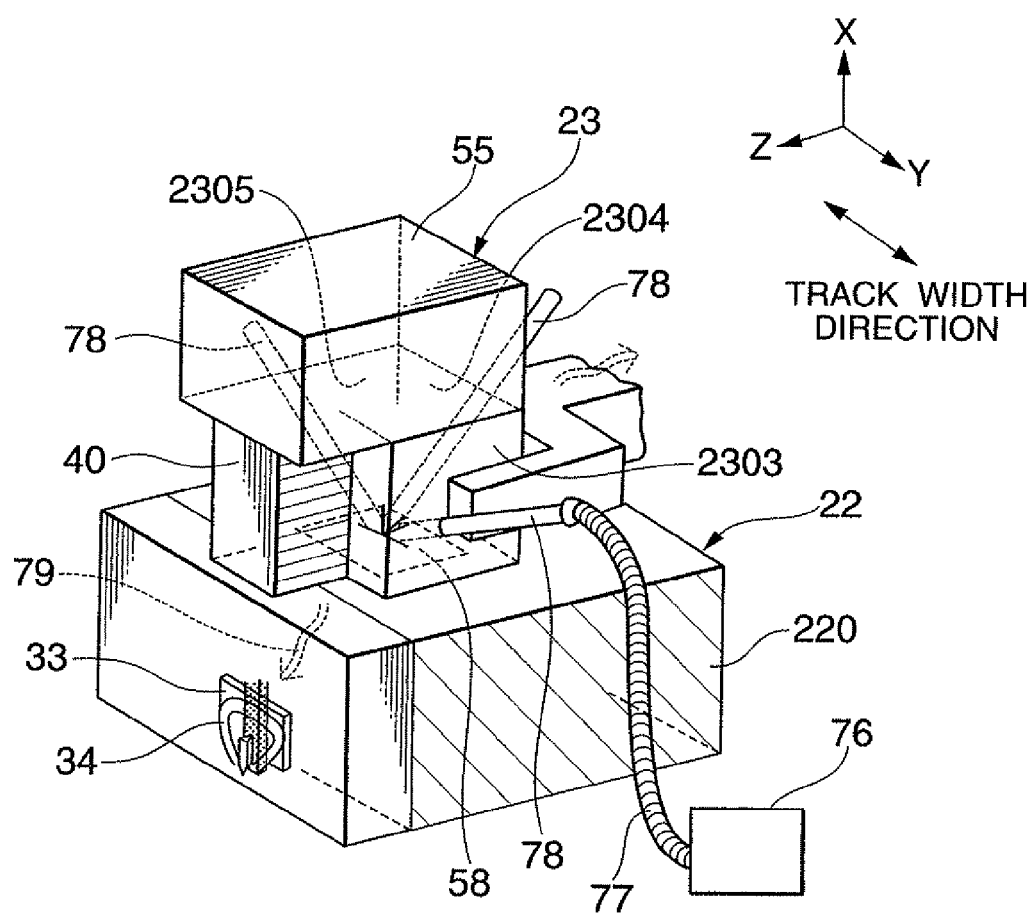
FIG. 9 shows a perspective view schematically illustrating an embodiment of a method for manufacturing the thermally-assisted magnetic recording head by joining the light source unit and the slider according to the present invention.

FIG. 9 shows a perspective view schematically illustrating an embodiment of a method for manufacturing the thermally-assisted magnetic recording head 21 by joining the light source unit 23 and the slider 22 according to the present invention.

In FIG. 9, first the light source unit 23 and the slider 22 are aligned with respect to each other in YZ-plane and then the light source unit 23 and the slider 22 are brought into contact with each other with a solder layer 58 between them to determine their positions. Then, the solder layer 58 between the light source unit 23 and the slider 22 is irradiated with light 78 through the unit substrate 230, the light 78 having a predetermined wavelength that passes through the unit substrate 230. The irradiation with the light 78 melts and solidifies the solder layer 58 to bond the light source unit 23 and the slider 22 to each other.

The light 78 may be Nd—YAG laser light (which has a wavelength of 1064 nm) emitted from an Nd—YAG laser oscillator 76 through an optical fiber 77. Here, YAG is the name of a crystal having a garnet structure, made of a composite oxide ($Y_3Al_5O_{12}$) of Y (yttrium) and Al (aluminum). Nd—YAG laser light can be obtained by using a YAG crystal in which a several percent of Y is replaced with Nd (neodymium) as the laser medium and is widely used in research, industrial, medical and other applications. If Nd—YAG laser light is used as the light 78, the unit substrate 230 is made of a material that has a transmittance higher than or equal to 50% at the wavelength of Nd—YAG laser light, such as Si (transmittance: 67%), GaAs (transmittance: 66%), or SiC (transmittance: 80%) so that the solder layer 58 can be irradiated with a sufficient amount of light 78 for melting through the unit substrate 230. The light 78 may be other type of laser light such as YAG laser light other than Nd—YAG laser light, solid-state laser light other than YAG laser light, or gas laser light such as carbon dioxide gas laser light. In all cases, light that has a wavelength that can pass through the unit substrate 230 and has output power required for melting the solder layer 58 is used. Alternatively, a material that can pass the wavelength of light used is used to form the unit substrate 230.

The solder layer 58 is preferably made of an alloy having a melting point lower than 400° C. as stated above. For example, if the solder layer 58 is made of an Au—Sn alloy (containing 20 weight % of Sn), the melting point of the solder layer 58 is approximately 280° C. Experiments have shown that irradiation of the solder layer 58 with Nd—YAG laser light 78 having light output power of 0.1 kW, a spot diameter of 100 μm, and a pulse width of 4 microseconds, for example, through the light source unit 23 melts the solder layer 58 sufficiently well enough to bond the light source unit 23 and the slider 22.

The light 78 is preferably emitted to at least one of side surfaces 2303, 2304 and 2305 of the unit substrate 230 that are adjacent to the joining surface 2300, targeted to the solder layer 58. This prevents the light 78 from hitting the slider substrate 220 to heat the slider substrate 220 before the light 78 reaches the solder layer 58. Furthermore, the slider substrate 220 is preferably made of a material that has a lower thermal conductivity than the material of the unit substrate 230. For example, if the unit substrate 230 is made of Si (thermal conductivity: 168 W/(m·K)), the slider substrate 220 is preferably made of a material such as Al—TiC ($Al_2O_3$—TiC) (thermal conductivity: 19.0 W/(m·K)) or $SiO_2$ (thermal conductivity: 10.7 W/(m·K)). A magnetic head element 32 including an MR element 33 and an electromagnetic transducer 34 is provided in the slider 22. If these elements are heated to temperatures higher than 200° C., for example, by heat 79 from the solder layer 58, the MR multilayer 322 (FIG. 5) of the MR element 33 tends to degrade, or the main magnetic pole 3400 or the lower shield 3450 (FIG. 5) of the electromagnetic transducer 34 tends to thermally expand to protrude to an undesirable extent, which can result in defects. However, if the conditions of irradiation direction and thermal conductivity described above are satisfied, excessive heating of the slider substrate 220 by irradiation with the light 78 is avoided and the amount of heat conducted to the slider substrate 220 out of the amount of heat generated from the solder layer 58 and the unit substrate 230 can be reduced. Consequently, adverse influence of heat on the MR element 33 and the electromagnetic transducer 34 can be suppressed.

Figure 10:
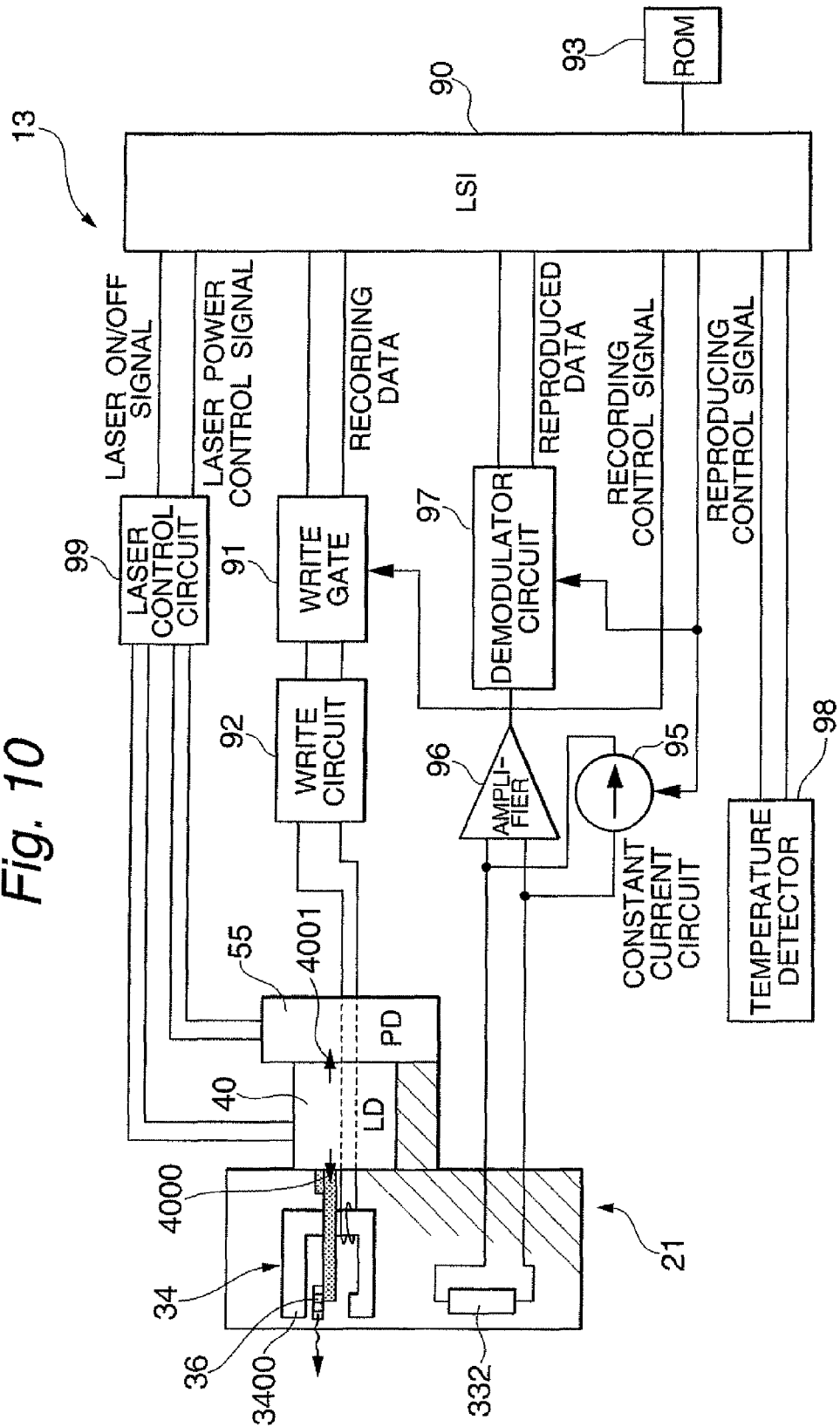
FIG. 10 shows a block diagram illustrating the circuit structure of the recording/reproducing and light-emission control circuit of the magnetic disk apparatus shown in FIG. 1.

FIG. 10 shows a block diagram illustrating the circuit structure of the recording/reproducing and light-emission control circuit 13 of the magnetic disk apparatus shown in FIG. 1.

According to FIG. 10, reference numeral 90 indicates a control LSI, 91 indicates a write gate for receiving recording data from the control LSI 90, 92 indicates a write circuit, 93 indicates a ROM that stores a control table or the like for controlling the value of operating current supplied to the laser diode 40, 95 indicates a constant current circuit for supplying sense current to the MR element 33, 96 indicates an amplifier for amplifying the output voltage from the MR element 33, 97 indicates a demodulator circuit for outputting reproduced data to the control LSI 90, 98 indicates a temperature detector, and 99 indicates a control circuit for controlling the laser diode 40, respectively.

The recording data outputted from the control LSI 90 is supplied to the write gate 91. The write gate 91 supplies recording data to the write circuit 92 only when a recording control signal outputted from the control LSI 90 instructs a write operation. The write circuit 92 applies write current according to this recording data to the write coil layer 343, and then a write operation is performed onto the magnetic disk with write field generated from the main magnetic pole 3400. Further, a constant current flows from the constant current circuit 95 into the MR multilayer 332 only when the reproducing control signal outputted from the control LSI 90 instructs a read operation. The signal reproduced by the MR element 33 is amplified by the amplifier 96, demodulated by the demodulator circuit 97, and then, the obtained reproduced data is outputted to the control LSI 90.

A laser control circuit 99 receives a laser ON/OFF signal and a laser power control signal that are outputted from a control LSI 90. When the laser ON/OFF signal indicates an ON operation, an operating current greater than or equal to an oscillation threshold is applied to a laser diode 40. This causes the laser diode 40 to emit light and the emitted laser light propagates through a spot-size converter 43 and a waveguide 35 to become coupled to a surface-plasmon generator 36 in a surface plasmon mode. As a result, NF-light is emitted from the end of the surface-plasmon generator 36, and is applied to the magnetic recording layer of the magnetic disk 10 to heat the magnetic recording layer.

The operating current is controlled to a value that causes the laser diode 40 to emit laser light with an intensity specified by the laser power control signal. Specifically, a photodiode 55 measures and monitors the output from the laser diode 40 and sends a monitoring output (measured value) to the laser control circuit 99. The laser control circuit 99 uses the measured value to make feedback adjustment for controlling the operating current applied to the laser diode 40 to cause the laser diode 40 to emit laser light with the intensity specified by the laser power control signal from the light-emission center 4000.

For the feedback adjustment, preferably the relationship between the intensity of laser light emitted from the light-emission center 4000 of the laser diode 40 and the monitoring output from the photodiode 55 which receives laser light emitted from the rear light-emission center 4001 is determined in advance. In the laser diode 40 of edge-emitting type, the ratio of the light output intensity from the rear light-emission center 4001 and the light output intensity from the light-emission center 4000 is set to be in the range, for example, from 2% to 25% depending on the design of the diode structure. Therefore, the relation between the light output intensity from the light-emission center 4000 and the monitoring output from the photodiode 55 can be obtained by clarifying the relation between the light output intensity from the rear light-emission center 4001 and the monitoring output from the photodiode 55.

The control LSI 90 generates the laser ON/OFF signal according to the timing of recording/reproducing operations, and determines the value of the laser power control signal by referring the value of temperature in the magnetic recording layer of the magnetic disk or the like, which is measured by the temperature detector 98, based on the control table in the ROM 93. Here, the control table may include data about the relationship between the operating current value and the mount of temperature increase due to thermal-assist operation in the magnetic recording layer, and data about the temperature dependence of the anisotropic magnetic field (coercive force) of the magnetic recording layer, as well as data about the temperature dependences of the oscillation threshold value and the characteristics of light output power vs. operating current. Thus, by providing the system of the laser ON/OFF signal and the laser power control signal independently from the recording/reproducing control signal system, it becomes possible to realize not only a current supply to the laser diode 40 linked simply with the recording operation but also more diversified current supply modes.

Obviously, the circuit structure of the recording/reproducing and light-emission control circuit 13 is not limited to the structure shown in FIG. 10. It is also possible to specify write and read operations by using signals other than the recording control signal and reproducing control signal.

As has been described above, the light source unit 23 according to the present invention includes the photodiode 55 which enables constant monitoring of light output from the laser diode 40. Accordingly, feedback adjustment of light output from the laser diode 40 that emits light for thermal assist can be accomplished. This adjustment enables light output from the laser diode 40 to be controlled in response to changes in light output due to surroundings and to changes with time to stabilize the intensity of light with which a magnetic recording medium is irradiated for thermal assist. Consequently, a region of a magnetic recording medium where data is to be written can be properly and stably heated. Therefore, a good thermally-assisted magnetic recording can be accomplished.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A light source unit that is to be joined to a slider to form a thermally-assisted magnetic recording head, the slider including an optical system formed in an element-integration surface of a slider substrate and configured to propagate a light for thermal assist, the light source unit comprising:
    a unit substrate comprising: a joining surface that faces the slider substrate when the unit substrate is bonded to the slider; and a source-installation surface adjacent to the joining surface;
    a light source provided in the source-installation surface and emitting the light for thermal assist that is to be entered into the optical system; and
    a photodetector configured to measure an output from the light source for adjusting the output, bonded to a rear joining surface of the unit substrate that is on the side opposite to the joining surface in such a manner that a rear light-emission center of the light source on the side opposite to a light-emission center from which the light for thermal assist is emitted is covered with a light-receiving surface of the photodetector.

2. The light source unit as claimed in claim 1, wherein a first lead electrode layer connected electrically to one electrode of the light source and one electrode of the photodetector and a second lead electrode layer connected electrically to the other electrode of the photodetector are provided in the source-installation surface of the unit substrate.

3. The light source unit as claimed in claim 2, wherein a bank layer is provided in a region on the source-installation surface of the unit substrate and in front of at least each of regions between the first and second lead electrode layers when viewed from the joining surface side.

4. The light source unit as claimed in claim 1, wherein the light source is a laser diode of edge-emitting type, and is bonded to the unit substrate in such a manner that an n-electrode is opposed to the source-installation surface.

5. The light source unit as claimed in claim 1, wherein an adhesion material layer for bonding with the slider is provided on the joining surface of the unit substrate.

6. A thermally-assisted magnetic recording head comprising:
    a slider comprising: an optical system formed in an element-integration surface of a slider substrate and configured to propagate a light for thermal assist; and a write head element provided in the element-integration surface and configured to write data on a magnetic recording medium; and
    a light source unit as claimed in claim 1 joined to the slider in such a manner that a back surface of the slider substrate and the joining surface of the unit substrate are opposed to each other so that a light emitted from the light-emission center can enter the optical system, the back surface being on the side opposite to an opposed-to-medium surface of the slider substrate.

7. The thermally-assisted magnetic recording head as claimed in claim 6, wherein a first lead electrode layer connected electrically to one electrode of the light source and one electrode of the photodetector and a second lead electrode layer connected electrically to the other electrode of the photodetector are provided in the source-installation surface of the unit substrate.

8. The thermally-assisted magnetic recording head as claimed in claim 6, wherein a light-receiving center in a light-receiving surface of the photodetector, the rear light-emission center of the light source, the light-emission center of the light source, and a light-receiving center in a light-receiving surface of the optical system are located substantially in a straight line, and a near-field light generator that emits a near-field light for thermal assist from an end extending to a head end surface on an opposed-to-medium surface side is provided in or near the straight line.

9. The thermally-assisted magnetic recording head as claimed in claim 8, wherein a distance between a surface of the photodetector that is on the side opposite to the light-receiving surface and the end of the near-field light generator extending to the head end surface on the opposed-to-medium surface side is less than or equal to 700 micrometers.

10. A head gimbal assembly comprising: a suspension; and the thermally-assisted magnetic recording head as claimed in claim 7 fixed on the suspension,
    a portion of the back surface of the slider substrate on the side opposite to the opposed-to-medium surface being bonded to the suspension, the suspension comprising a aperture, and the light source unit protruding through the aperture on the side opposite to the slider with respect to the suspension, and
    one ends of wiring members provided on the suspension being electrically connected with the first lead electrode layer, the second lead electrode layer, and the other electrode of the light source.

11. A magnetic recording apparatus comprising: at least one head gimbal assembly as claimed in claim 10; at least one magnetic recording medium; and a control circuit configured to control light-emission operations of the light source by using a monitor output from the photodetector, and to control write operations that the thermally-assisted magnetic recording head performs to the at least one magnetic recording medium.

12. A method for manufacturing the light source unit as claimed in claim 2, the manufacturing method comprising the steps of:
    forming a plurality of pairs of a first lead electrode layer and a second lead electrode layer on a source-installation surface of a light-source-unit row bar;
    bonding a photodetector row bar onto a rear joining surface of the light-source-unit row bar that is on the side opposite to a joining surface of the light-source-unit row bar in such a manner that a plurality of light-receiving surfaces and a plurality of pairs of electrodes of the photodetector row bar are positioned on the light-source-unit row bar side and exposed, the photodetector row bar being to be cut into photodetectors;

butting the light source against the photodetector row bar so that a light-receiving surface of the photodetector row bar covers a rear light-emission center of the light source and thus positioning the plurality of light sources while placing each of the plurality of light sources on the first lead electrode layer with one electrode of the light source positioned at the bottom of the light source;

bonding the plurality of light sources to a light-source-unit row bar; and cutting the light-source-unit row bar to which the photodetector row bar and the plurality of light sources have been bonded into a plurality of light source units.

13. The manufacturing method as claimed in claim 12, further comprising the steps of:

providing a bank layer in a region on the source-installation surface of the light-source-unit row bar, the region being in front of at least each of regions between the first and second lead electrode layers when viewed from the joining surface side;

stacking a plurality of the light-source-unit row bars in each of which a plurality of sets of the first lead electrode layer, the second lead electrode layer, and the bank layer are formed, in such a manner that the plurality of sets formed are sandwiched between the light-source-unit row bars and joining surfaces of the light-source-unit row bars are aligned on the same side; and depositing a conductive material on the joining surfaces of the plurality of stacked light-source-unit row bars to form an adhesion material layer for bonding with a slider while using the bank layer to prevent the conductive material from being deposited at least between the first and second lead electrode layers.

14. The manufacturing method as claimed in claim 13, wherein an alloy containing one element selected from a group consisting of gold, silver, copper, germanium, aluminum and magnesium is deposited on the joining surfaces of the plurality of stacked light-source-unit row bars to form the adhesion material layer.

* * * * *